US012558638B2

(12) United States Patent
Salom et al.

(10) Patent No.: US 12,558,638 B2
(45) Date of Patent: Feb. 24, 2026

(54) FILTER FOR FILTERING FLUID, BYPASS VALVE ARRANGEMENT FOR A FILTER, AND DIFFUSER DEVICE FOR A FILTER

(71) Applicant: MANN+HUMMEL GmbH, Ludwigsburg (DE)

(72) Inventors: Rafael Salom, Remseck (DE); Mike Maertz, Harthausen (DE); Christian Thalmann, Speyer (DE); Mischa Winter, Bruehl (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 598 days.

(21) Appl. No.: 17/867,930

(22) Filed: Jul. 19, 2022

(65) Prior Publication Data

US 2022/0347607 A1 Nov. 3, 2022

Related U.S. Application Data

(63) Continuation of application No. PCT/EP2021/051206, filed on Jan. 20, 2021.

(Continued)

(51) Int. Cl.
*B01D 35/14* (2006.01)
*B01D 35/147* (2006.01)
*B01D 36/00* (2006.01)

(52) U.S. Cl.
CPC ......... *B01D 35/147* (2013.01); *B01D 36/001* (2013.01); *B01D 2201/301* (2013.01)

(58) Field of Classification Search
CPC ................ B01D 35/147; B01D 36/001; B01D 2201/301
See application file for complete search history.

(56) References Cited

U.S. PATENT DOCUMENTS 2,487,115 A     11/1949  Dyke
3,457,949 A *   7/1969   Coulter ................. F16K 15/025
                                              251/333

(Continued)

FOREIGN PATENT DOCUMENTS

CN          205781116 U      12/2016
DE            10248907 A1 *   4/2004  ........... B01D 35/147

(Continued)

OTHER PUBLICATIONS

EPO Search Report in corresponding EPO Appln. No. 25163463.0, Apr. 23, 2024, Munich, Germany.

(Continued)

*Primary Examiner* — Waqaas Ali

(57) ABSTRACT

A filter for filtering fluid has a filter housing with fluid inlet for fluid to be filtered and fluid outlet for filtered fluid. A filter element arranged in the filter housing separates fluid inlet fluidically from fluid outlet. A bypass valve arrangement is arranged fluidically between fluid inlet and fluid outlet such that it fluidically connects in an open state fluid inlet to fluid outlet. The bypass valve arrangement has a valve closure body arranged movably in the valve housing between a closed position and an open position. The bypass valve arrangement has a valve seat element with valve seat. The valve closure body rests sealingly at the valve seat in closed position. The valve seat element is connected to a part of the valve housing by a mechanical connection realized by relative rotation between valve seat element and part of the valve housing about a valve axis.

31 Claims, 10 Drawing Sheets

Related U.S. Application Data

(60) Provisional application No. 62/965,238, filed on Jan. 24, 2020.

(56) References Cited

U.S. PATENT DOCUMENTS

| | | | |
|---|---|---|---|
| 3,750,888 A * | 8/1973 | Rinaldo | F15B 21/041 |
| | | | 210/172.6 |
| 3,853,763 A | 12/1974 | Hall et al. | |
| 5,277,154 A | 1/1994 | Mcdowell | |
| 5,591,243 A | 1/1997 | Colussi et al. | |
| 11,305,217 B2 | 4/2022 | Salom et al. | |
| 2003/0160450 A1* | 8/2003 | Kozak | F16L 41/10 |
| | | | 285/353 |
| 2009/0101595 A1 | 4/2009 | Allott et al. | |
| 2009/0134078 A1 | 5/2009 | Pfitzer et al. | |
| 2010/0230342 A1 | 9/2010 | Jainek | |

| | | | |
|---|---|---|---|
| 2011/0062061 A1 | 3/2011 | Chajec | |
| 2013/0270162 A1 | 10/2013 | Ardes | |
| 2013/0327429 A1 | 12/2013 | Ardes | |
| 2014/0283689 A1 | 9/2014 | Guerry et al. | |
| 2018/0065067 A1 | 3/2018 | Ardes | |
| 2019/0168142 A1 | 6/2019 | Domingues et al. | |
| 2019/0388814 A1 | 12/2019 | Hawkins | |

FOREIGN PATENT DOCUMENTS

| | | |
|---|---|---|
| DE | 202005003047 U1 | 7/2006 |
| EP | 0154952 A2 | 9/1985 |
| FR | 2845929 A1 | 4/2004 |

OTHER PUBLICATIONS

Office Action in corresponding Chinese Appln. No. 202180010883.2, Apr. 11, 2025, 9 pages, China.

* cited by examiner

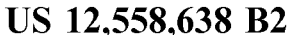
_Fig. 4_
_Fig. 5_

FILTER FOR FILTERING FLUID, BYPASS VALVE ARRANGEMENT FOR A FILTER, AND DIFFUSER DEVICE FOR A FILTER

CROSS-REFERENCE TO RELATED APPLICATIONS

This application is a continuation application of international application No. PCT/EP2021/051206 having an international filing date of 20 Jan. 2021 and designating the United States, the international application claiming the benefit of U.S. provisional application No. 62/965,238 filed 24 Jan. 2020, the entire contents of the aforesaid international application and the aforesaid United States provisional application being incorporated herein by reference.

BACKGROUND OF THE INVENTION

U.S. Pat. No. 3,750,888 discloses a filter assembly which is mounted in a hydraulic reservoir or tank. The filter assembly comprises a cylindrical housing, a conically shaped base, a cartridge-shaped filter element that is seated on the base, an outlet opening that is configured through the base and positioned in the interior of the filter element, and a diffusion means or element. The housing is provided with an inlet opening through which the liquid that is returned from a remote control system is supplied into the filter assembly. The fluid flows through the filter element, into its interior, and through the outlet opening and the diffusion element into the tank. A bypass valve is mounted movably on the connection bolt at an end of the filter element. In case the element is clogged, the minimal pressure difference resulting therefrom above the valve enables that the valve opens against a spring so that the returning liquid can bypass the element until the element is exchanged.

SUMMARY OF THE INVENTION

The invention concerns a filter for filtering fluid, with at least one filter housing which comprises at least one fluid inlet for the fluid to be filtered and at least one fluid outlet for filtered fluid, with at least one filter element which is arranged in the at least one filter housing such that it separates the at least one fluid inlet fluidically from the at least one fluid outlet, with at least one bypass valve arrangement which is arranged fluidically between the at least one fluid inlet and the at least one fluid outlet such that the at least one bypass valve arrangement in its open state connects the at least one fluid inlet fluidically to the at least one fluid outlet, wherein the at least one bypass valve arrangement comprises at least one valve closure body which is movable between at least one closed position and at least one open position, and at least one valve seat at which the at least one valve closure body can rest sealingly in at least one closed position.

Furthermore, the invention concerns a bypass valve arrangement for a filter for filtering fluid, wherein the bypass valve arrangement can be arranged fluidically between at least one fluid inlet and at least one fluid outlet of the filter such that the at least one bypass valve arrangement in its open state connects the at least one fluid inlet fluidically to the at least one fluid outlet, and wherein the at least one bypass valve arrangement comprises at least one valve closure body, which is movable between at least one closed position and at least one open position, and at least one valve seat at which the at least one valve closure body can rest sealingly in at least one closed position.

In addition, the invention concerns a filter element for a filter for filtering fluid with at least one bypass valve arrangement that is fastened to an end body of the filter element such that the at least one bypass valve arrangement in its open state connects at least one raw fluid side of the filter element fluidically to at least one clean fluid side of the filter element, wherein the at least one bypass valve arrangement comprises at least one valve closure body, which is movable between at least one closed position and at least one open position, and at least one valve seat at which the at least one valve closure body can rest seal-tightly in at least one closed position.

Moreover, the invention concerns a filter for filtering fluid, with at least one filter housing which comprises at least one fluid inlet for fluid to be filtered and at least one fluid outlet for filtered fluid, with at least one filter element, which is arranged in the at least one filter housing fluidically between the at least one fluid outlet and the at least one fluid inlet, and with at least one diffuser device for filtered fluid which is fluidically connected to at least one fluid outlet.

Moreover, the invention concerns a diffuser device for a filter for filtering fluid, with at least one diffuser connection section with which the diffuser device can be connected fluidically to at least one fluid outlet of a filter housing of the filter.

The invention has the object to provide an improved filter, an improved bypass valve arrangement, an improved filter element, and an improved diffuser device. In particular, the invention has the object to design a filter, a bypass valve arrangement, a filter element, and a diffuser device in which a treatment of fluid, in particular removal of undesirable media from fluid, can be performed more efficiently and/or more reliably.

The object is solved according to the invention for a filter in that the at least one bypass valve arrangement comprises at least one valve housing, in which the at least one valve closure body is movably arranged, and at least one valve seat element, which comprises at least one valve seat, wherein the at least one valve seat element is connected by means of at least one mechanical connection to at least one part of the at least one valve housing, wherein the connection can be realized by means of at least one relative rotation between the at least one valve seat element and the at least one part of the at least one valve housing about an imaginary valve axis of the at least one bypass valve arrangement.

According to the invention, the at least one bypass valve arrangement comprises a valve housing. In the valve housing, the at least one valve closure body is movably arranged. Moreover, at least one valve seat element, which comprises at least one valve seat, is connected by means of at least one mechanical connection to at least one part, in particular a circumferential wall and/or a bottom, of the at least one valve housing. In this manner, the at least one bypass valve arrangement can be assembled more easily. The mechanical connection can be realizable by means of at least one relative rotation about an imaginary valve axis. In this manner, the at least one valve seat element and the at least one part of the at least one valve housing can be assembled more easily.

Advantageously, the at least one valve seat element can at least partially form the at least one valve housing. In particular, a circumferential wall of at least one valve seat element can at least partially form a circumferential wall of the at least one valve housing.

Advantageously, the at least one valve closure body is movable axially in relation to the valve axis. In this manner, force introductions within the at least one bypass valve arrangement can be improved.

Advantageously, the filter can comprise at least one inlet opening for fluid to be purified and at least one outlet opening for purified fluid. The filter housing can be configured for attachment to a liquid storage container, i.e., fuel tank, and comprise at least one housing body (housing bottom) and at least one fastening flange at the housing body as well as a housing cover with which an openable installation opening can be closed. The at least one installation opening can be arranged at the axial top side of the housing body.

A filter element can also be referred to as filter cartridge. The filter element can be used in a liquid filter. The filter element can be exchangeably arranged in a filter housing.

Advantageously, at least one bypass valve arrangement can comprise a pressure control valve. With a pressure control valve, a pressure between the input side and the output side can be controlled. At least one bypass valve arrangement, in particular a pressure control valve, can be used in a liquid filter.

Advantageously, the bypass valve arrangement can comprise a valve housing, a valve return element, in particular a spring, a valve closure body, in particular a valve body, and a valve seat element, in particular a valve seat. The valve return element and the valve closure body can be arranged advantageously within the valve housing. A first axial end of the valve return element can be supported at the valve housing. A second axial end of the valve return element can act on the valve closure body and can push the valve closure body against the valve seat of the valve seat element.

The valve seat element can be embodied as a hollow cylindrical screw that comprises an outer thread. The outer thread can correspond with an inner thread that can be provided at an axial end of the valve housing. The hollow cylindrical screw can comprise an operating element, in particular an actuation section, at a first axial end and a valve seat section, in particular the valve seat, at the second axial end that is positioned opposite the first axial end. The valve closure body can contact the valve seat when the valve is closed. The valve closure body can move away from the valve seat element, in particular the valve seat, with compression of the valve return element when the pressure on the valve closure body surpasses a predefined opening pressure.

In an advantageous embodiment, the at least one mechanical connection between the at least one valve seat element and the at least one part of the at least one valve housing can be a screw connection. Screw connections can be simply realized by a relative rotation in which the at least one valve seat element is rotated relative to the at least one part of the at least one valve housing about the valve axis.

With screw connections, an efficient force transmission in direction axial to the valve axis can be enabled.

For a further advantageous embodiment, at least one valve seat element can comprise at least one thread, in particular an outer thread and/or an inner thread, and/or the at least one part of the at least one valve housing can comprise at least one thread, in particular an inner thread and/or an outer thread, and/or at least one thread of at least one valve seat element and/or at least one thread of the at least one part of the at least one valve housing can be a non-self-tapping thread and/or at least one thread of at least one valve seat element and/or at least one thread of the at least one part of the at least one valve housing can be a self-tapping thread. Advantageously, at least one valve seat element and the respectively corresponding at least one part of the at least one valve housing can each have a thread. In this manner, the threads can be screwed into each other.

In this context, at least one valve seat element can comprise an outer thread and the corresponding valve housing an inner thread. In this way, the valve seat element can be screwed correspondingly into the at least one part of the at least one valve housing. Alternatively, at least one valve seat element can comprise at least one inner thread and the corresponding at least one part of the at least one valve housing at least one outer thread. In this manner, the valve seat element can be screwed onto the at least one part of the at least one valve housing.

At least one thread can be a non-self-tapping thread. In this manner, the at least one thread can be screwed precisely into a corresponding non-self-tapping thread of the corresponding component.

Alternatively or additionally, at least one thread can be a self-tapping thread. A self-tapping thread can be screwed into an opening of the corresponding component and thereat cut a corresponding thread. In this manner, a manufacturing expenditure can be reduced.

In a further advantageous embodiment, at least one valve housing can comprise at least one valve seal section which is acting in relation to the valve axis at least radially and/or at least one valve housing can comprise at least one valve seal section which interacts seal tightly with at least one element seal section on the part of at least one filter element. In this manner, a region which adjoins the at least one valve housing can be sealed.

A radially sealingly acting valve seal section can be combined simply with an axial mounting direction between the components.

Advantageously, at least one valve housing can comprise at least one valve seal section which interacts sealingly with at least one element seal section on the part of at least one filter element. In this manner, the at least one bypass valve arrangement can be mounted sealingly at and/or in the at least one filter element. In this context, the at least one valve seal section and the at least one element seal section can act radially sealingly in relation to the valve axis. Thus, the at least one bypass valve arrangement can be installed in relation to the valve axis in axial direction into a corresponding opening, in particular an opening of an end body, in particular of an end disk or end cap, of the at least one filter element.

Advantageously, the valve housing can comprise at least one radially outer seal surface that is configured such that it sealingly contacts an inner seal surface of an opening provided in an end body of a filter element.

In a further advantageous embodiment, at least one valve seat element can comprise at least one housing fastening element with which the at least one valve seat element is connected to at least one part of the at least one filter housing. In this manner, the at least one valve seat element and thus the entire bypass valve arrangement, by means of the mechanical connection to the valve housing, can be held at the part of the at least one filter housing.

Advantageously, at least one housing fastening element can be part of a rotary and/or insertable connection, in particular a locking connection, plug-in connection, snap-on connection, screw connection, bayonet closure-type connection or the like. Such connections can be connected easily. Moreover, rotary and/or insertable connections can also be configured such that they can be released again without being destroyed. Thus, the at least one part of the at least one filter housing and/or the at least one valve seat element can be reused.

Advantageously, at least one housing fastening element of at least one valve seat element can comprise at least one locking hook and/or a locking hook arrangement. Locking hooks can be easily connected by means of a plug-in connection.

Advantageously, the at least one valve seat element can be connected in particular by means of at least one housing fastening element to a housing cover of the at least one filter housing. In this manner, the at least one valve seat element and thus the at least one bypass valve arrangement can be separated together with the housing cover from the remainder of the filter housing, in particular a filter pot.

Advantageously, the valve housing can comprise a locking section for locking the bypass valve arrangement at corresponding locking sections of a filter housing cover.

In a further advantageous embodiment, at least one valve seat element can comprise at least one operating section at which the at least one valve seat element can be operated for connecting to the at least one valve housing. In this manner, the at least one valve seat element and the at least one valve housing can be assembled more easily.

Advantageously, at least one operating section can comprise at least one receptacle for an operating tool, in particular a wrench, especially a hexagon socket wrench, or the like. In this manner, mounting forces for assembly or disassembling forces for separating the components can be introduced better.

Advantageously, the at least one operating section can comprise at least one passage for fluid. In this manner, the at least one operating section can serve additionally as inlet or outlet for fluid which is to pass the bypass valve arrangement in the open state.

In a further advantageous embodiment, at least one bypass valve arrangement can comprise at least one valve return element which engages at at least one valve closure body, on the one hand, and at least one valve housing, on the other hand. With the at least one valve return element, the at least one valve closure body can be pushed in its closed position against the at least one valve seat.

Advantageously, at least one valve return element can be at least one elastic return element, in particular a spring element or the like. Elastic valve return elements can reassume their original shape after cancellation of the deformation force. Spring elements can be realized technically in a simple manner. Advantageously, at least one valve return element can comprise at least one coil spring. Coil springs can be arranged in a space-saving way, acting in axial direction, in particular axial to the valve axis.

Advantageously, at least one valve return element can comprise at least one coil pressure spring. Coil pressure springs can be supported, on the one hand, on the side, facing away from the valve seat, of a section of the at least one valve closure body that is corresponding with the valve seat, in particular a valve plate, and on a corresponding section of the valve housing, on the other hand.

In a further advantageous embodiment, at least one valve seat element and/or the at least one part of the at least one valve housing can comprise at least one seal device for sealing a region between the at least one valve seat element and the at least one part of the at least one valve housing. In this manner, it can be prevented that in a closed position fluid can flow through the at least one bypass valve arrangement.

Advantageously, at least one seal element can be arranged on at least one circumferential side of the at least one valve seat element which is radially inward and/or radially outward in relation to at least one valve axis. Alternatively or additionally, at least one seal element can be arranged on at least one circumferential side of the at least one part of the at least one valve housing which is radially inward and/or radially outward in relation to at least one valve axis. In this way, a region between the respective circumferential sides of the at least one valve seat element and of the at least one part of the at least one valve housing can be sealed.

Advantageously, at least one seal element can have at least one seal bead. A seal bead can be realized in a simple manner, in particular at a circumferential side.

Advantageously, at least one valve housing can comprise at least one flow-through opening for fluid. In this manner, the fluid can flow into the valve housing and out of it.

Advantageously, at least one valve housing can be realized as valve basket or valve cage. In a valve basket or valve cage, at least one wall comprises a plurality of openings. Advantageously, the wall can be realized of a plurality of stays. The openings in a wall of the valve housing can serve as flow-through openings for fluid.

Advantageously, at least one valve housing can comprise or be comprised of plastic material, metal, composite material or the like. Alternatively or additionally, at least one valve seat element can comprise or be comprised of plastic material, metal, composite material or the like. Plastic material can be easily shaped. Metal can be realized stably. A self-tapping thread can be realized advantageously of metal. Self-tapping threads can be easily screwed into plastic material.

In a further advantageous embodiment, the filter can be an in-tank filter and/or the filter can be a liquid filter and/or a gas filter.

An in-tank filter is arranged in a tank for the fluid, in particular a liquid tank, for filtering the fluid upon entering the tank or upon exiting from the tank. With a liquid filter, liquids can be separated from contaminants, in particular particles and/or gases, in particular air.

Advantageously, the filter can be a liquid filter. With the liquid filter, liquids, in particular oil, fuel, hydraulic liquid, processing liquid, urea-water solution, water or the like can be filtered. Advantageously, the filter can be an erosion filter.

Alternatively or additionally, the filter can be a gas filter, in particular an air filter. In this manner, also gaseous fluid, in particular air, compressed air, compressor air, oxygen or the like, can be freed from particles, in particular dirt, dust, oil or the like, by means of the filter.

The invention can be used for cleaning operating fluids of internal combustion engines, in particular fuel, oil or air, or of hydraulic systems, in particular of motor vehicles.

The invention can be used in motor vehicles, in particular passenger cars, trucks, motorcycles, tractors, buses, agricultural and/or construction vehicles, construction/agricultural machines, compressors, industrial motors or other devices, in particular with internal combustion engines. The invention can be used in land vehicles, watercraft and/or aircraft.

Advantageously, the filter can comprise a filter housing that is suitable for attachment at a fluid storage container, in particular a fuel tank, an oil tank, a tank for hydraulic oil, a water tank, a tank for urea-water solution, a tank for hydraulic liquid, an air tank, a gas tank or the like.

Advantageously, the filter housing can comprise at least one housing body and at least one mounting flange that is suitable for attachment at an installation opening of a liquid storage container, tank.

Advantageously, the filter housing can comprise at least one housing cover. With a housing cover, an in particular openable installation opening can be closable. Advantageously, the at least one installation opening can be arranged at the axial top side of a filter pot of the filter housing.

In a further advantageous embodiment, at least one valve seat element can be a hollow cylinder with at least one thread, in particular an inner thread and/or outer thread. Fluid can flow through a hollow cylinder. In this way, the at least one valve seat element can serve additionally as fluid channel. With an inner thread and/or an outer thread, a screw connection between the at least one valve seat element and the at least one valve housing can be produced which can be connected and separated by means of a rotational movement.

In a further advantageous embodiment, the filter can comprise at least one diffuser device which is connected to at least one fluid outlet. With at least one diffuser device, a flow cross section of the exiting filtered fluid can be enlarged. In this way, a flow of the fluid can be calmed. Gas particles contained possibly in a liquid, in particular air particles, can thus be separated better from the filtered fluid.

A diffuser device can be arranged at a fluid outlet of a liquid filter in a tank, in particular for use upon immersion into the liquid stored in a tank.

Advantageously, the diffuser device can be immersed into the liquid stored in a tank. In this way, the liquid purified with the filter can be distributed in the tank by means of the diffuser device.

Furthermore, the object is solved according to the invention for the bypass valve arrangement in that the at least one bypass valve arrangement comprises at least a valve housing, in which the at least one valve closure body is movably arranged, and at least one valve seat element, which comprises at least one valve seat, wherein the at least one valve seat element is connected by means of at least one mechanical connection to at least one part of the at least one valve housing, wherein the mechanical connection can be realized by means of at least one relative rotation between the at least one valve seat element and the at least one part of the at least one valve housing about an imaginary valve axis of the at least one bypass valve arrangement.

In addition, the object is solved according to the invention for the filter element in that the filter element comprises at least one receptacle for at least one bypass valve arrangement.

According to the invention, the filter element comprises at least one receptacle for at least one bypass valve arrangement. In this manner, the bypass valve arrangement can be mounted at the filter element.

In an advantageous embodiment, the filter element can be a hollow filter element in which a filter medium at least partially surrounds an element interior.

A hollow filter element is characterized in that it comprises at least one element interior which is surrounded by the filter medium. The filter medium can be flowed through by the fluid to be filtered from the exterior to the interior to the element interior, or in reverse. The element interior comprises a fluid passage to the exterior through which, depending on the flow direction, the filtered fluid exits the element interior or fluid to be filtered reaches the latter. The filter medium can circumferentially surround the element interior in relation to an element axis. On at least one end face that is axial in relation to the element axis, the filter medium can be connected to an end body, in particular an end disk or end cap, that can also be referred to as end cap. At least one end body can comprise at least one through opening for the element interior.

The hollow filter element can be advantageously a so-called round filter element with a round cross section, an oval round filter element with an oval cross section, a flat-oval round filter element with a flattened oval cross section, a conical round filter element in which the round cross section tapers in axial direction relative to a major axis, a conical-oval round filter element in which the oval cross section tapers in axial direction at least in direction of a minor axis, a conical flat-oval round filter element in which the flat oval cross section tapers in axial direction at least in direction of the minor axis, or a hollow filter element with a different type, in particular an angular, cross section and/or a different type axial cross-sectional course in direction of an element axis.

The filter medium can advantageously be closed or open circumferentially in relation to the element axis. The filter medium can be in particular folded or bent in a star shape, preferably zigzag-shaped or corrugated. The filter medium can also be not folded or not bent.

The fluid to be filtered can flow through the filter medium from the exterior to the interior into the element interior or from the element interior to the exterior. Furthermore, in the element interior at least one bypass valve arrangement can be arranged in a space-saving manner.

Advantageously, at least one end body can comprise at least one opening for at least one bypass valve arrangement. The at least one bypass valve arrangement can be inserted into the at least one opening. The at least one bypass valve arrangement can thus be arranged in a space-saving manner at least partially in an element interior of the at least one filter element. The at least one opening and the element interior can serve in this way as receptacle of the at least one filter element for the at least one bypass valve arrangement.

Advantageously, at least one element seal section can be arranged at the at least one end body. At least one valve seal section on the part of the at least one bypass valve arrangement can interact sealingly with the at least one element seal section.

Advantageously, the hollow filter element can comprise an outer flow protection section. In this manner, the filter body can be protected from direct fluid flow, in particular radially in relation to an element axis. The flow protection region can be realized in connection with at least one end body.

Advantageously, at least one filter element can comprise a hollow cylindrical filter medium and two end caps which close the axial end faces of the filter medium. The first end cap can comprise a flat annular base section. An outer cylindrical flow protection section can project from the outer rim of the base section in direction of the second end cap. The outer cylindrical flow protection section can have an axial length that is designed such that the filter medium is protected from direct radial flow that is entering through the fluid inlet channel into the filter housing.

Advantageously, the first end cap can comprise a central opening that comprises a radial seal that is configured such that it can contact sealingly an outer seal surface of a bypass valve arrangement arranged at the central opening of the first end cap.

Moreover, the object is solved according to the invention for the filter in that the at least one diffuser device comprises a plurality of fluid guiding surfaces.

With the fluid guiding surfaces, a course of flow of the filtered fluid, which exits from the at least one fluid outlet of the filter housing, can be affected. In this way, the fluid flow can be calmed. In case of liquid fluids, possibly present gas bubbles, in particular air bubbles, can be better separated for calm fluid flow than for turbulent fluid flow.

When using the filter as a so-called in-tank filter, the filtered fluid can be discharged into the tank via the at least one diffuser device. With the fluid guiding surfaces, the flow of the fluid is calmed in such a way that the residence time of the fluid in the tank is increased. The longer the residence time of the fluid in the tank, the better the separation of possibly present gas, in particular air, from the fluid. By use of a plurality of fluid conducting surfaces, the fluid flow of the filtered fluid can be affected in a targeted manner.

With a plurality of fluid guiding surfaces, fluid channels can be delimited or separated from each other.

Advantageously, the at least one diffuser device can be realized as a one-piece component. In this manner, the stability of the at least one diffuser device can be increased.

Advantageously, the at least one diffuser device can be realized by use of thermoplastic material, in particular of a group of polyamide, polyester, polypropylene, or another thermoplastic material. Advantageously, the at least one diffuser device can be produced according to an injection molding process.

In an advantageous embodiment, the at least one diffuser device can comprise at least one fluid guiding channel and/or at least one fluid guiding channel of at least one diffuser device can be delimited with at least one fluid guiding surface. In a fluid guiding channel, the fluid flow can be guided in a controlled fashion. In this manner, the flow can be calmed better.

Advantageously, at least one fluid channel can have a round or oval cross section. In this manner, the at least one fluid channel can be delimited with a single circumferentially continuous fluid guiding surface.

Alternatively or additionally, at least one fluid guiding channel can comprise an angular, in particular square, triangular or the like, cross section. In this manner, the at least one fluid channel can be delimited with a plurality of fluid guiding surfaces.

In a further advantageous embodiment, at least two fluid guiding surfaces can extend at least in sections parallel to each other and/or at least one fluid guiding channel can comprise at least in sections a constant cross section and/or at least two fluid guiding surfaces at least in sections, viewed in fluid flow direction, can extend away from each other and/or at least one fluid guiding channel at least in sections, viewed in fluid flow direction, can widen. In this manner, the course of the fluid guiding surfaces and/or of the fluid guiding channel can be adapted in accordance with the requirements.

With at least two fluid guiding surfaces that at least in sections extend parallel to each other and/or at least one fluid guiding channel which at least in sections comprises a constant cross section, a uniform fluid flow can be achieved.

With two fluid guiding surfaces which at least in sections, viewed in fluid flow direction, extend away from each other and/or at least one fluid guiding channel that at least in sections, viewed in fluid flow direction, widens, a flow cross section can be enlarged and thus the flow velocity can be reduced.

In a further advantageous embodiment, at least one fluid guiding surface at least in sections can extend at an angle between approximately 90° and 180° in relation to a main inflow axis of the at least one diffuser device and/or at least one channel axis of at least one fluid guiding channel can extend at an angle between approximately 90° and 180° in relation to a main inflow axis of the at least one diffuser device. In this manner, the flow direction of the exiting filtered fluid can be changed accordingly by an angle between 90° and 180°. As a whole, the flow velocity can be further reduced in this way. The separation of gas bubbles can be further improved in this way.

Advantageously, the at least one fluid guiding surface and/or the at least one channel axis can extend at an angle of more than 90°, preferably more than 130°, preferably less than 170°, in relation to the main inflow axis.

The main inflow axis in the meaning of the invention is an imaginary axis along which the filtered fluid passes from the fluid outlet of the filter housing into a diffuser inlet channel of the diffuser device.

Advantageously, the main inflow axis can extend parallel or coaxial to a filter axis of the filter and/or a filter element axis of an in particular hollow filter element. In this manner, the arrangement of the filter can be in line with the diffuser device. In this way, the arrangement as a whole can be constructed more narrow.

In a further advantageous embodiment, at least two fluid guiding surfaces and/or at least two fluid guiding channels can be arranged on different sides in relation to a main inflow axis of the at least one diffuser device and/or at least two fluid guiding surfaces and/or at least two fluid guiding channels can be arranged on the same side in relation to the main inflow axis of the at least one diffuser device. In this manner, a cross section of the outflowing filtered fluid from the diffuser device can be enlarged as a whole. The fluid can thus be distributed more uniformly as a whole. In addition, a flow velocity can thus be further reduced.

Advantageously, fluid guiding surfaces and/or fluid channels can be arranged on opposite sides. In this way, the at least one diffuser device can be constructed symmetrically as a whole.

Alternatively or additionally, a plurality of fluid guiding surfaces and/or fluid channels can be arranged on one side. In this way, an exit-side flow cross section on one side of the main inflow axis can be enlarged as a whole.

In a further advantageous embodiment, at least one fluid guiding surface and/or at least one fluid guiding channel can extend curved at least in sections and/or at least one fluid guiding surface and/or a fluid guiding channel can extend straight at least in sections and/or at least one fluid guiding channel can extend spirally and/or helically at least in sections.

With a curved extension, the at least one fluid guiding surface and/or the at least one fluid guiding channel as a whole can be extended without the outer dimensions of the diffuser device having to be enlarged. In this manner, the residence time of the fluid at the at least one fluid guiding surface and/or in the at least one fluid guiding channel can be prolonged and in this way the fluid calmed further.

Fluid guiding surfaces and/or fluid guiding channels that extend straight can be realized technically more easily.

In case of spiral or helical fluid guiding channels, a ratio between channel length and required construction space can be further improved.

In a further advantageous embodiment, at least one diffuser device can comprise at least one diffuser connection section for connection to at least one fluid outlet of at least one filter housing and/or comprise at least one connection seal element for sealing the at least one diffuser device in relation to at least one fluid outlet of at least one filter housing.

With a diffuser connection section, the at least one diffuser device can be connected in a simple manner fluidically to the at least one fluid outlet.

With at least one connection seal element, it can be prevented that fluid can exit in an uncontrolled fashion between the at least one diffuser device and the at least one fluid outlet of the at least one filter housing.

Advantageously, at least one connection seal element can comprise at least one seal surface. A corresponding seal element, in particular a seal body, on the part of the at least one fluid outlet can rest sealingly against a seal surface. Alternatively or additionally, at least one connection seal element can comprise at least one seal body. A seal body can rest seal-tightly against a corresponding seal element, in particular a seal surface, on the part of the at least one fluid outlet.

Advantageously, at least one seal body as a seal ring and/or at least one seal surface can be designed as a circumferentially continuous seal surface. With such seal bodies and seal surfaces, a circumferential sealing action can be realized.

Advantageously, the at least one connection seal element can act sealingly in relation to the diffuser main flow axis in radial direction and/or in axial direction. In this manner, the seal action as a whole can be improved. Depending on the configuration, a corresponding installation tolerance can be realized also.

In a further advantageous embodiment, at least one diffuser device can comprise at least one diffuser fixation element for fixation of the at least one diffuser device on the at least one filter housing. In this manner, it can be prevented that the at least one diffuser device connected to the fluid outlet can detach in an uncontrolled manner.

Advantageously, at least one diffuser fixation element can be quickly activatable. In this manner, mounting can be simplified, in particular accelerated.

Advantageously, at least one diffuser fixation element can be a fixation element that can be detachable without being destroyed. In this manner, as needed, in particular for servicing purposes and/or for an exchange of the at least one diffuser device, the fixation can be released without being destroyed and activated again.

Advantageously, at least one diffuser fixation element can comprise or be comprised of a rotary and/or insertable fixation device, in particular a locking connection, a snap-on connection, a screw connection, a bayonet closure-type connection, a plug-in connection or a combination of different connections. Such fixation devices can be activated simply and quickly and, as needed, can be released without being destroyed.

Advantageously, at least one diffuser fixation element can be a locking hook. The locking hook can be connected in a simple manner to a corresponding projection on the part of the filter housing.

Alternatively, the at least one filter housing can comprise at least one locking hook and the at least one diffuser device can comprise at least one diffuser fixation element in the form of a projection which can interact with the at least one locking hook for fixation.

In a further advantageous embodiment, at least one diffuser device can comprise at least one diffuser inlet channel which is connected to at least one fluid guiding channel and/or extends to at least one fluid guiding surface, and/or a main inflow axis of the at least one diffuser device can extend within at least one diffuser inlet channel and/or at least one diffuser inlet channel of at least one diffuser device can comprise at least in sections a round cross section and/or at least one diffuser inlet channel of at least one diffuser device can comprise at least in sections a constant cross section.

By means of a diffuser inlet channel, the at least one fluid outlet of the at least one filter housing can be connected to the at least one fluid guiding channel and/or the at least one fluid guiding surface. In this way, the diffuser inlet channel can act essentially as an adapter between the fluid outlet of the filter housing and the at least one fluid channel and/or at least one fluid guiding surface.

With the at least one diffuser inlet channel, the geometric shape, in particular the cross section, of the fluid outlet of the at least one filter housing can be adapted to the geometric shape, in particular the cross section in the region of the at least one fluid guiding channel and/or of the at least one fluid guiding surface.

Furthermore, with the at least one diffuser inlet channel the course of flow of the filtered fluid from the fluid outlet to the fluid guiding channel and the at least one fluid guiding surface can be adapted.

A main inflow axis of the at least one diffuser device can extend in the at least one diffuser inlet channel. In this manner, a flow direction of the fluid can be defined therein.

At least one diffuser inlet channel can comprise at least in sections a round cross section. A round cross section is symmetric in relation to its rotational orientation. In this way, the at least one diffuser inlet channel can be arranged in various rotational orientations at the fluid outlet of the filter housing. In this way, the orientation of the at least one diffuser device, in particular the outlet direction of the filtered fluid from the at least one diffuser device, can be adjusted more flexibly.

The diffuser inlet channel can comprise at least in section a constant cross section. In this manner, a uniform fluid flow can be achieved in the diffuser inlet channel.

Advantageously, a diffuser device can comprise an axial tubular diffuser inlet channel with an inlet opening that is configured such that it can be attached to an outlet opening of a filter, in particular a fluid outlet opening. Advantageously, the inlet channel can define an inlet flow direction, in particular a diffuser main flow direction, along the axial direction from the inlet opening through the inlet channel. Advantageously, the diffuser device can comprise at least one diffuser channel, in particular a fluid guiding channel, that is connected to the diffuser inlet channel downstream of the inlet opening. Advantageously, the diffuser channel can be configured such that it discharges fluid, in particular liquid, into a tank. Advantageously, the diffuser channel can extend from the inlet channel at an acute angle so that fluid, in particular liquid, that passes from the inlet channel into the diffuser channel, is subjected to a directional change of more than 90°, preferably of more than 130°, preferably of less than 170°.

Advantageously, the diffuser device can comprise a plurality of diffuser channels.

Advantageously, the diffuser device can comprise a plurality of parallel diffuser channels.

Advantageously, the plurality of diffuser channels can comprise a first plurality of parallel diffuser channels and a second plurality of diffuser channels.

The second plurality of diffuser channels can extend in a direction which is opposite to the direction of the first plurality of diffuser channels. Advantageously, a configuration can be produced that can comprise a symmetry plane along the axial axis of the inlet channel.

Advantageously, the diffuser device can be produced as a one-piece component by use of thermoplastic material, selected from the group of polyamide, polyester, polypropylene or another thermoplastic material, formed by an injection molding process.

Moreover, the object is solved according to the invention for the diffuser device in that the at least one diffuser device comprises a plurality of fluid guiding surfaces.

In other respects, the features and advantages which have been disclosed in connection with the filter according to the invention, the bypass valve arrangement according to the invention, the filter element according to the invention, and the diffuser device according to the invention and their respective advantageous embodiments apply among each other likewise and vice versa. The individual features and advantages can of course be combined with each other, wherein further advantageous effects can be produced that go beyond the sum of the individual effects.

BRIEF DESCRIPTION OF THE DRAWINGS

Further advantages, features, and details of the invention result from the following description in which embodiments of the invention will be explained in no more detail with the aid of the drawing. A person of skill in the art will consider the features disclosed in combination in the drawing, the description, and the claims expediently also individually and combine them to expedient further combinations. The drawings show schematically embodiments of the invention.

FIG. 4 shows an isometric detail view of the diffuser device of the filter of FIGS. 1 to 3.

FIG. 5 shows a longitudinal section of the diffuser device of the filter of FIGS. 1 to 3.

In the Figures, same components are provided with same reference characters.

DESCRIPTION OF PREFERRED EMBODIMENTS

Figure 1:
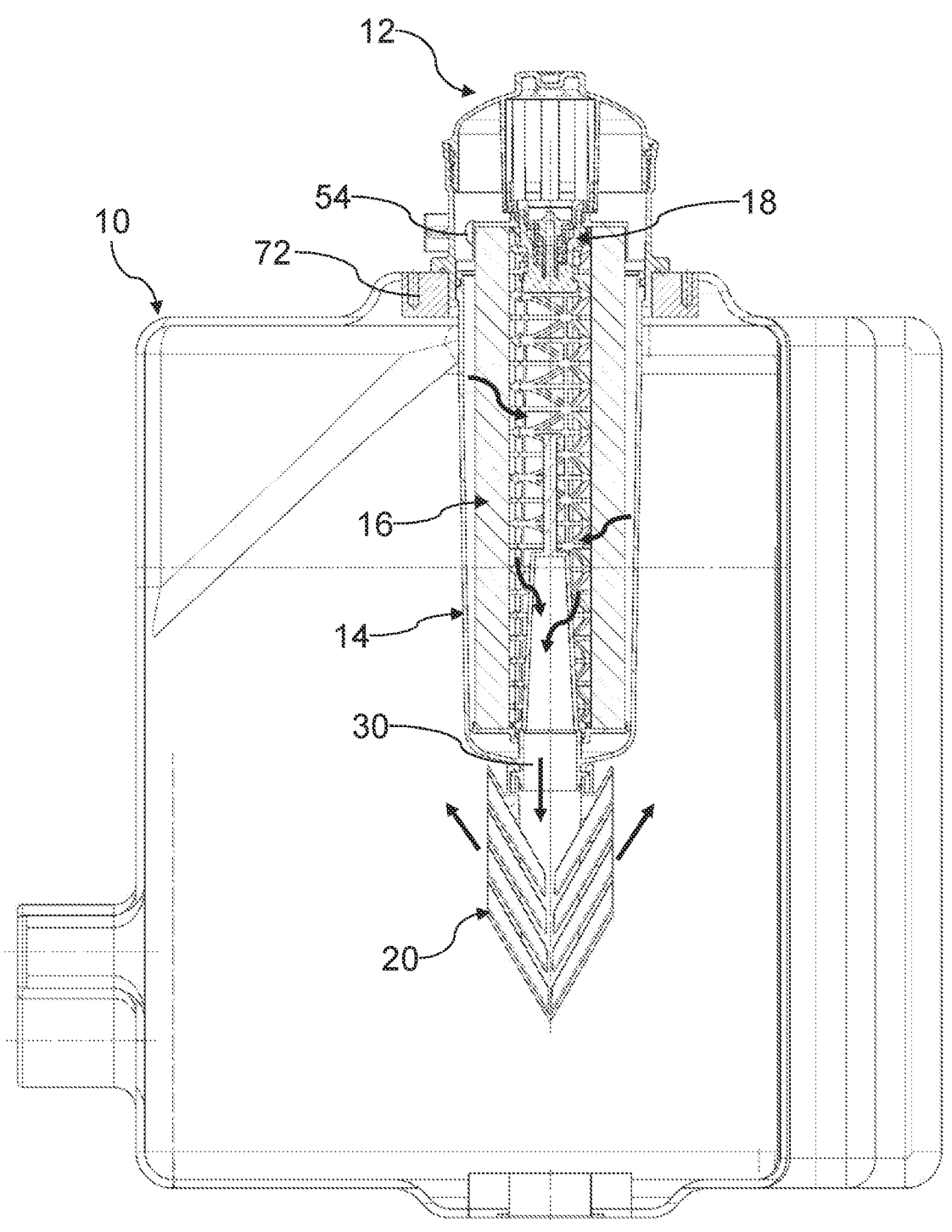
FIG. 1 shows a longitudinal section of a tank for liquid in which a filter according to a first embodiment with a bypass valve arrangement according to a first embodiment and a diffuser device according to a first embodiment is arranged.

In FIG. 1, a tank 10 for liquid, for example, fuel, oil, hydraulic oil, urea-water solution or the like, is illustrated. In the tank 10, a filter 12 in the form of a liquid filter as a so-called in-tank filter according to a first embodiment is arranged. The filter 12 is inserted into a top wall of the tank 10 and extends into the interior of the tank 10. Outside of the tank 10, the filter 12 is accessible from the exterior.

The filter 12 and its components are illustrated in FIGS. 2 to 8 in different perspectives, section views, and detail illustrations.

The filter 12 comprises a filter housing 14 in which a filter element 16 and a bypass valve arrangement 18 according to a first embodiment are arranged. Moreover, the filter 12 comprises a diffuser device 20 in the first embodiment. The diffuser device 20 is illustrated in detail in FIGS. 4 and 5. The bypass valve arrangement 18 is illustrated in detail in FIGS. 7 and 8. The connection of the bypass valve arrangement 18 to the filter element 16 is illustrated in detail in FIG. 6.

Figure 2:
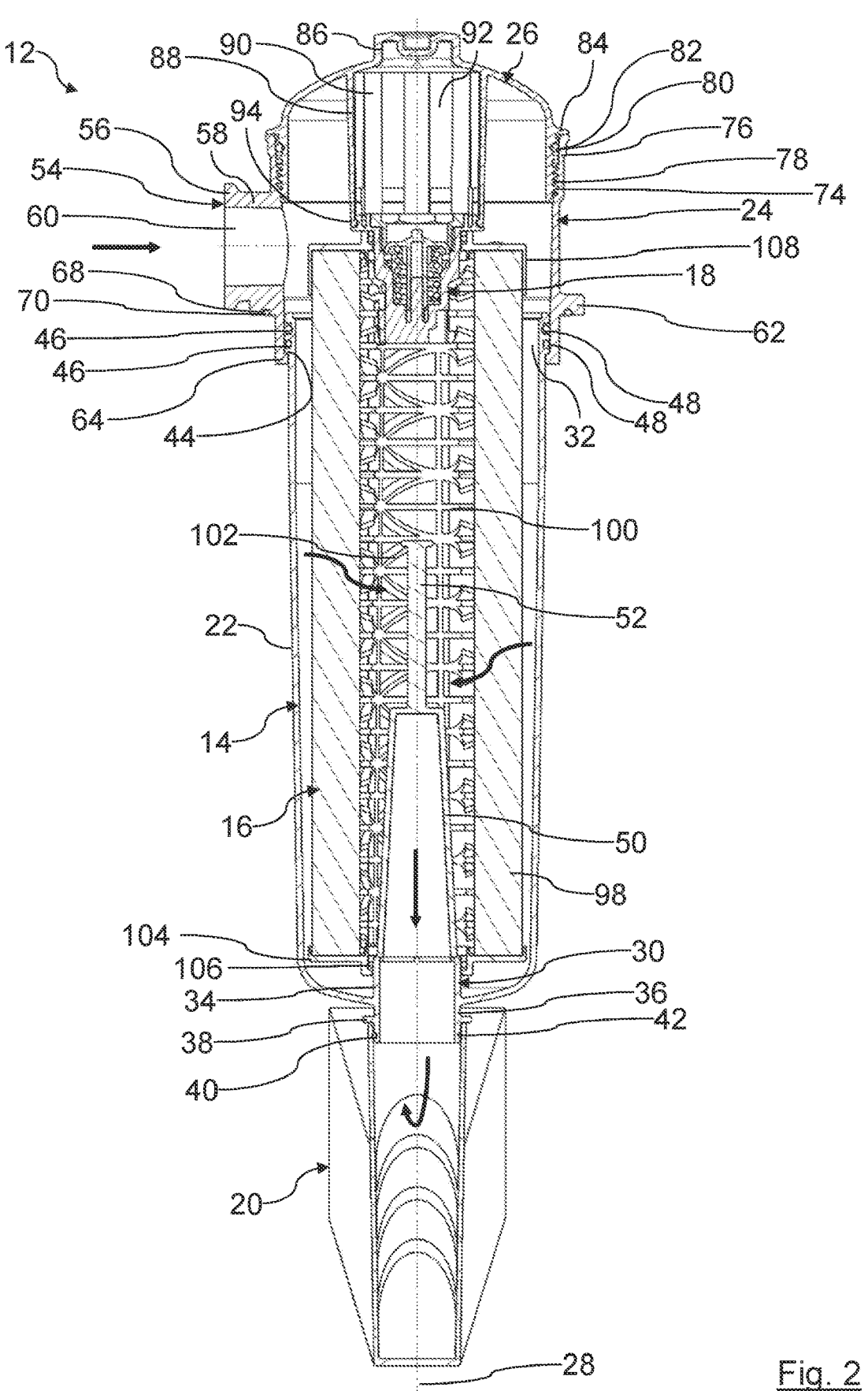
FIG. 2 shows a longitudinal section of the filter of FIG. 1.
Figure 3:
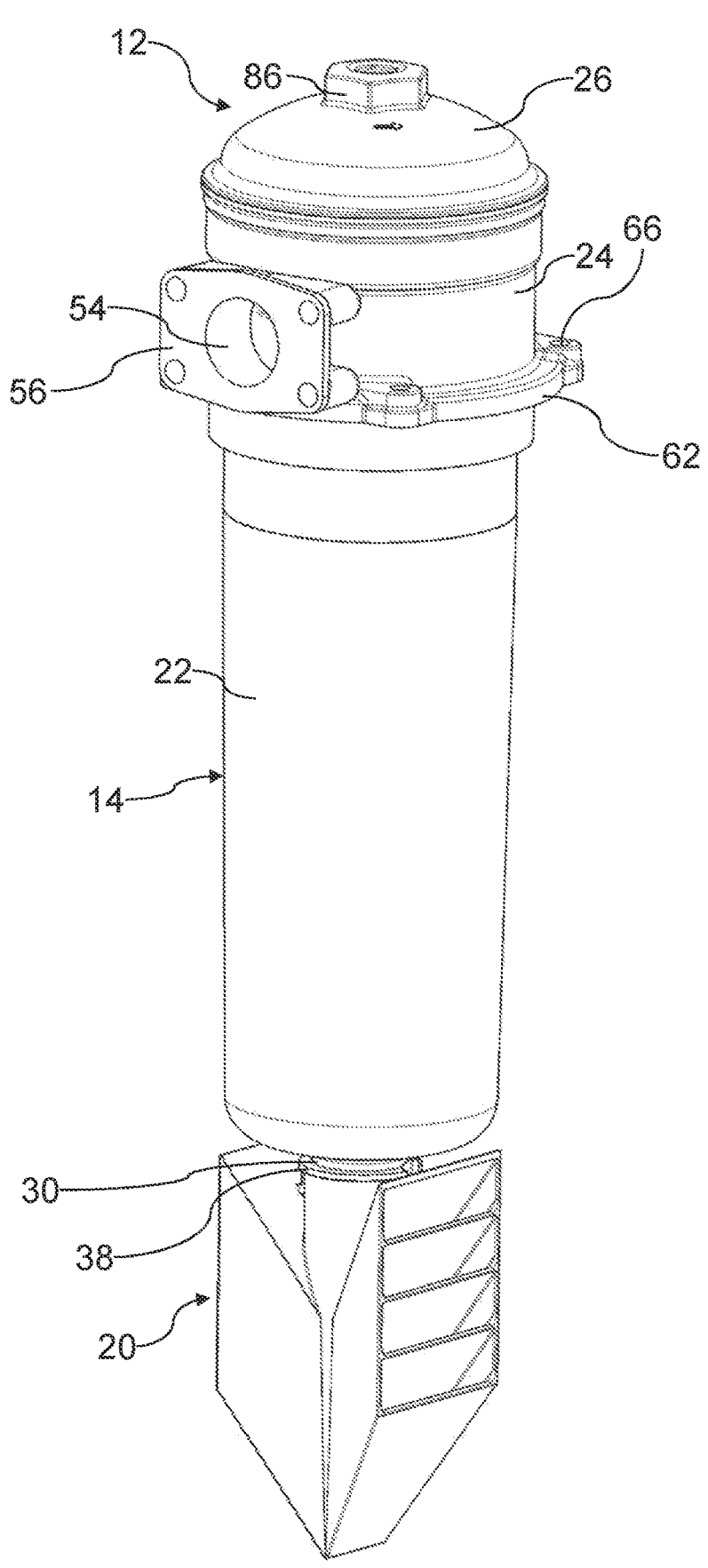
FIG. 3 shows an isometric view of the filter of FIGS. 1 and 2.

The filter housing 14 comprises a housing pot 22, in FIGS. 1 to 3 at the bottom, a housing connection part 24 at the center, and a housing cover 26 at the top. The housing pot 22 has approximately the shape of a hollow circular cylinder coaxial to an imaginary filter axis 28.

The filter axis 28 coincides in the embodiment with a valve axis 128 of the bypass valve arrangement 18 and a diffuser main flow axis 204 of the diffuser device 20. When in the following "radial", "coaxial", "axial", "tangential", "circumferential", "concentric", "eccentric" or the like is mentioned, this relates to the axis corresponding to the context, if nothing to the contrary is mentioned.

On an axial end face, in FIGS. 1 to 3 at the bottom, the housing pot 22 comprises a bottom section in which an exemplary coaxial fluid outlet 30 is located. On the oppositely positioned axial end face, at the top, the housing pot 22 comprises an installation opening 32 for the filter element 16.

The fluid outlet 30 comprises an exemplary coaxial circular cylinder outlet socket 34 which has a hollow interior. The outlet socket 34 has a smaller diameter than the housing pot 22. The outlet socket 34 extends in axial direction through the bottom of the housing pot 22. Viewed axially, the outlet socket 34 extends approximately with one half into the interior of the housing pot 22 and with the other half outside of the housing pot 22.

The portion of the outlet socket 34 which is located outside of the housing pot 22 is configured as a connection part 36 for the diffuser device 20. The connection part 36 comprises a circumferential locking collar 38. Viewed from the locking collar 38 toward the free end of the connection part 36, the outer diameter of the connection part 36 tapers conically. In front of the free end of the connection part 36, a seal receptacle 40 extends continuously circumferentially. In the seal receptacle 40, a seal ring 42 is arranged. The seal ring 42 is acting sealingly in radial direction.

The installation opening 32 of the housing pot 22 extends radially across the entire inner cross section of the housing pot 22. In the region of the end face rim which surrounds the installation opening 32, the housing pot 22 has a shoulder 44. The shoulder 44 extends at the radially outer circumferential side circumferentially and radially outwardly. In the radially outer circumferential side of the shoulder 44, two seal receptacles 46 are arranged. The seal receptacles 46 each extend circumferentially continuously. Viewed in axial direction, the seal receptacles 46 are arranged adjacent to each other. In each seal receptacle 46, a seal ring 48 is arranged. The seal rings 48 each are acting sealingly in radial direction.

At the end of the outlet socket 34 which is located in the interior of the housing pot 22, an exemplary coaxial central tube 50 is attached. Viewed from the outlet socket 34, the central tube 50 tapers toward its free end. At its free end, the central tube 50 comprises a coaxial rod-shaped attachment 52. The circumferential wall of the central tube 50 is permeable for fluid. In an exemplary fashion, the central tube 50 is inserted with one end into the outlet socket 34.

The housing connection part 24 comprises approximately the shape of a hollow circular cylinder which is open at both axial ends. The housing connection part 24 is coaxial to the filter axis 28. The housing connection part 24 comprises a fluid inlet 54 and a mounting flange 62. The fluid inlet 54 comprises an inlet socket 58 which surrounds an inlet channel 60. The inlet socket 58 extends radially outwardly on a circumferential side of the housing connection part 24. A connection flange 56 is arranged at the free end of the inlet socket 58. The connection flange 56 comprises in an exemplary fashion four screw openings at which a corresponding pipe conduit socket of a fluid supply line, not illustrated, can be detachably fastened. The housing connection part 24 is realized with the mounting flange 62 and the inlet socket 58 in a one-piece configuration.

At an axial end rim, in FIGS. 1 to 3 at the bottom, that is facing the housing pot 22 in the mounted state, the housing connection part 24 comprises a stop web 64 at the radially inner circumferential side. The stop web 64 extends radially inwardly. An inner diameter in the region of the stop web 64 is smaller than an outer diameter of the shoulder 44 of the housing pot 22. Also, the inner diameter of the stop web 64 is larger than the outer diameter of the housing pot 22 outside of the shoulder 44. The inner diameter of the housing connection part 24 in axial direction adjacent to the stop web 64 is somewhat larger than the outer diameter of the shoulder 44 of the housing pot 22.

Figure 6:
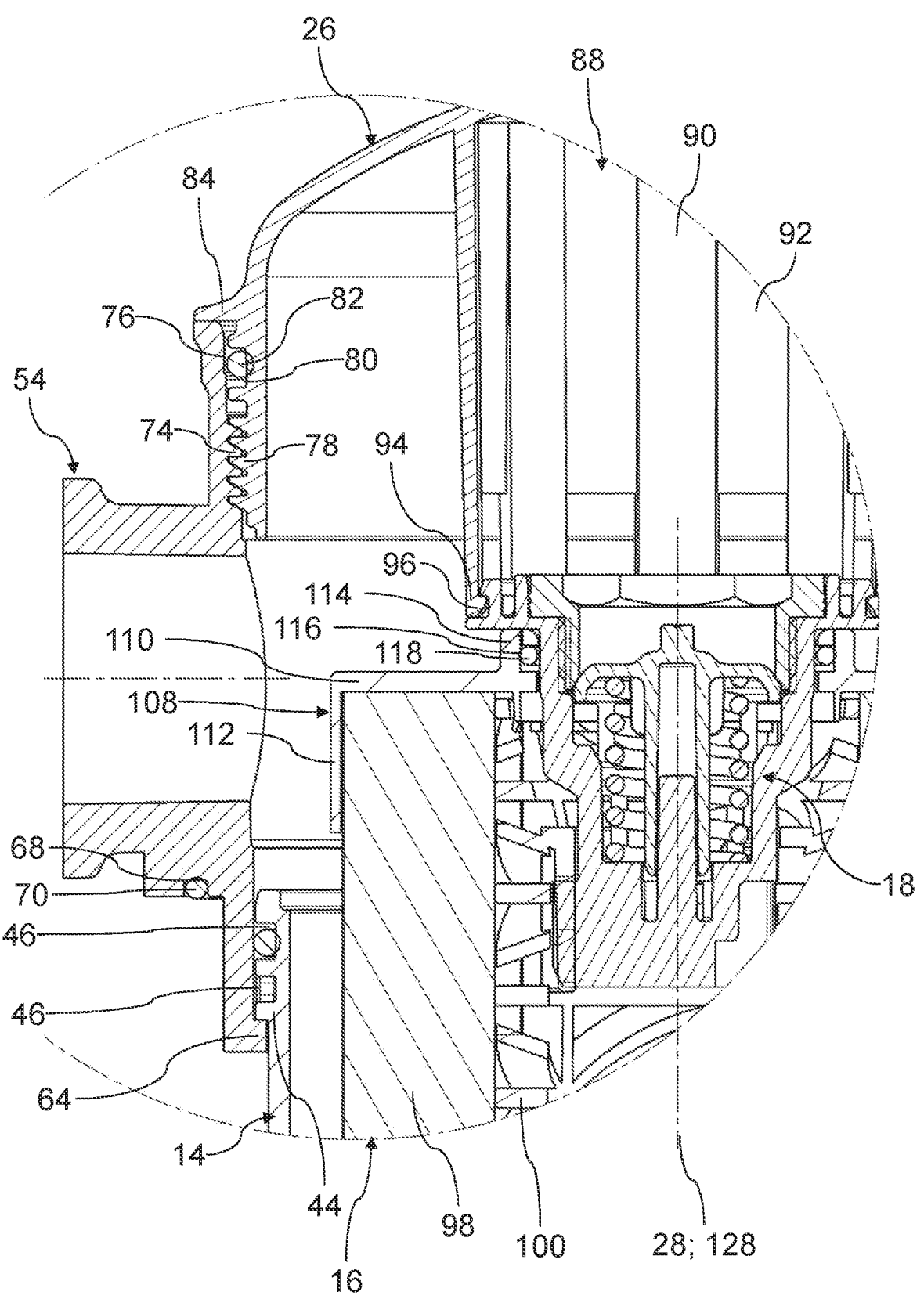
FIG. 6 shows a detail view of the longitudinal section of the filter of FIG. 2 in the region of the connection of the bypass valve arrangement in a top end cap of a filter element of the filter.

For mounting, the housing pot 22, with its bottom end provided with the fluid outlet 30 leading, can be inserted in axial direction through the opening at the end of the housing part 24 which is axially facing away from the stop web 64. In the mounted state, the stop web 64, as illustrated in FIGS. 2 and 6, is contacting the shoulder 44 in axial direction. The seal rings 48 are sealingly contacting radially the radially inner circumferential side of the housing connection part 24 which acts as a seal surface.

The mounting flange 62 of the housing connection part 24 is located between the inlet socket 58 and the free rim with the stop web 64. The mounting flange 62 extends circumferentially at the radially outer circumferential side of the housing connection part 24. The mounting flange 62 comprises, circumferentially distributed, four screw holes 66, for example. The axes of the screw holes 66 extend parallel to the filter axis 28. At its axial end face facing the rim of the housing connection part 24 with the stop web 64, the mounting flange 62 comprises a seal receptacle 68. A seal ring 70 is arranged in the seal receptacle 68.

When the filter 12 is mounted in tank 10, the mounting flange 62 is resting on a corresponding tank mounting section 72 of the tank 10. The mounting flange 62 is screwed with four screws to the tank mounting section 72. The seal ring 70 is positioned, acting sealingly in axial direction, on a corresponding seal surface of the tank mounting section 72.

Between the inlet 58 and the free rim which is positioned opposite the stop web 64, the housing connection part 24 comprises an inner thread 74 at its radially inner circumferential side. Between the inner thread 74 and the free rim of the axial end face of the housing connection part 24, the radially inner circumferential side of the housing connection part 24 is designed as a seal surface 76. Toward the axial free rim, the seal surface widens approximately in a funnel shape and forms thus an insertion ramp for the housing cover 26.

The housing cover 26 comprises a coaxial circular cylindrical circumferential wall. On an axial end face which is facing the housing pot 22 in the mounted state, the housing cover 26 is open. The housing cover 26 is closed at the axially oppositely positioned end face.

Axially adjacent to the open rim, the housing cover 26 comprises at its radially outer circumferential side an outer thread 78. The outer thread 78 matches the inner thread 74 of the housing connection part 24. In the mounted state, the outer thread 78 is screwed into the inner thread 74.

At the side axially opposite the free rim, a circumferentially continuous seal receptacle 80 is arranged adjacent to the outer thread 78 in the radially outer circumferential side of the housing cover 26. In the seal receptacle 80, a seal ring 82 is arranged. With mounted housing cover 26, the seal ring 82, acting sealingly in radial direction, is resting against the seal surface 76 of the housing connection part 24.

At the side of the seal receptacle 80 that is axially opposite the outer thread 78, a stop web 84 is realized. The stop web 84 extends at the radially outer circumferential side of the housing cover 26 radially outwardly. In the mounted state of the housing cover 26, the free rim of the housing connection part 24 is resting against the stop web 84. In this way, it can be prevented that the housing cover 26 is screwed in too far into the housing connection part 24.

On its closed side, the housing cover 26 is provided externally with an engagement element 86. The engagement element 86 is configured in an exemplary fashion in the form of a hexagon and coaxial to the filter axis 28. For example, a tool, for example, a wrench, can be engaged with the engagement element 86 in order to screw the housing cover 26 into the housing connection part 24 or to unscrew it therefrom.

In the interior of the housing cover 26, a coaxial holding basket 88 is arranged. The holding basket 88 has approximately the shape of a coaxial hollow circular cylinder. The holding basket 88 is connected to the closed side of the housing cover 26 in a one-piece configuration.

The holding basket 88 comprises at the free end a coaxial circumferentially continuous annular stay 94 and a plurality of basket stays 90. The basket stays 90 each extend approximately parallel to the filter axis 28 between the annular stay 94 and the closed side of the housing cover 26. Through openings 92 for fluid are realized between the basket stays 90.

The radially inner circumferential side of the annular stay 94 forms a circumferentially continuous locking projection 96. At its side which is axially facing the housing pot 22, the locking projection 96 comprises an insertion ramp for a housing fastening element 178 of the bypass valve arrangement 18. The holding basket 88 projects in axial direction past the free rim of the circumferential wall of the housing connection part 24.

The filter element 16 is designed in an exemplary fashion as a round filter element. The filter element 16 comprises a filter medium 98, for example, in the form of filter nonwoven or the like, which coaxially surrounds a coaxial support basket 100. The filter medium 98 and the support basket 100 surround an element interior 102 of the filter element 16.

At an end face which is axially facing the fluid outlet 30, the filter element 16 comprises an outlet-side end cap 104. The outlet-side end cap 104 extends in radial direction past the axial end face of the filter medium 98. At the center, the outlet-side end cap 104 comprises an insertion opening. Through the insertion opening, the central tube 50 and the inner part of the connection socket 34 project into the element interior 102.

At the radially outer circumferential side, the end cap 104 comprises a wall section extending in axial direction and in circumferential direction and surrounding the filter medium 98. At the radially inner circumferential side, the outlet-side end cap 104 is stepped forming a seal receptacle in which a seal ring 106, for example, of elastomer, is arranged. When the filter element 16 is installed, the seal ring 106 is resting at the radially outer circumferential side of the outlet socket 34, which forms a seal surface, so as to seal in radial direction.

At the end face which is axially facing the housing cover 26, the filter element 16 comprises an inlet-side end cap 108. The inlet-side end cap 108 comprises a flat base section 110 extending in radial direction and a radially outer cylindrical flow protection section 112 which is extending away from the radially outer rim of the base section 110 in the direction toward the outlet-side end cap 104. The axial length of the flow protection section 112 is designed such that the filter medium 98 is protected from a direct radial flow of fluid entering the filter housing 14 through the fluid inlet 54.

The inlet-side end cap 108 comprises a coaxial seal cylinder section 114 at the radially inner circumferential side. The seal cylinder section 114 extends in axial direction away from the flow protection section 112. In its radially inner circumferential side, the seal cylinder section 114 comprises a seal receptacle 116 in which a seal ring 118, for example, in form of an O-ring, is arranged. The seal ring 118 can be of elastomer, for example. In addition or as an alternative to the seal ring 118, the seal can also be provided by the material of the end cap 108. A seal which is acting sealingly in axial direction or axial and radial direction can be provided also.

Figures 7, 8:
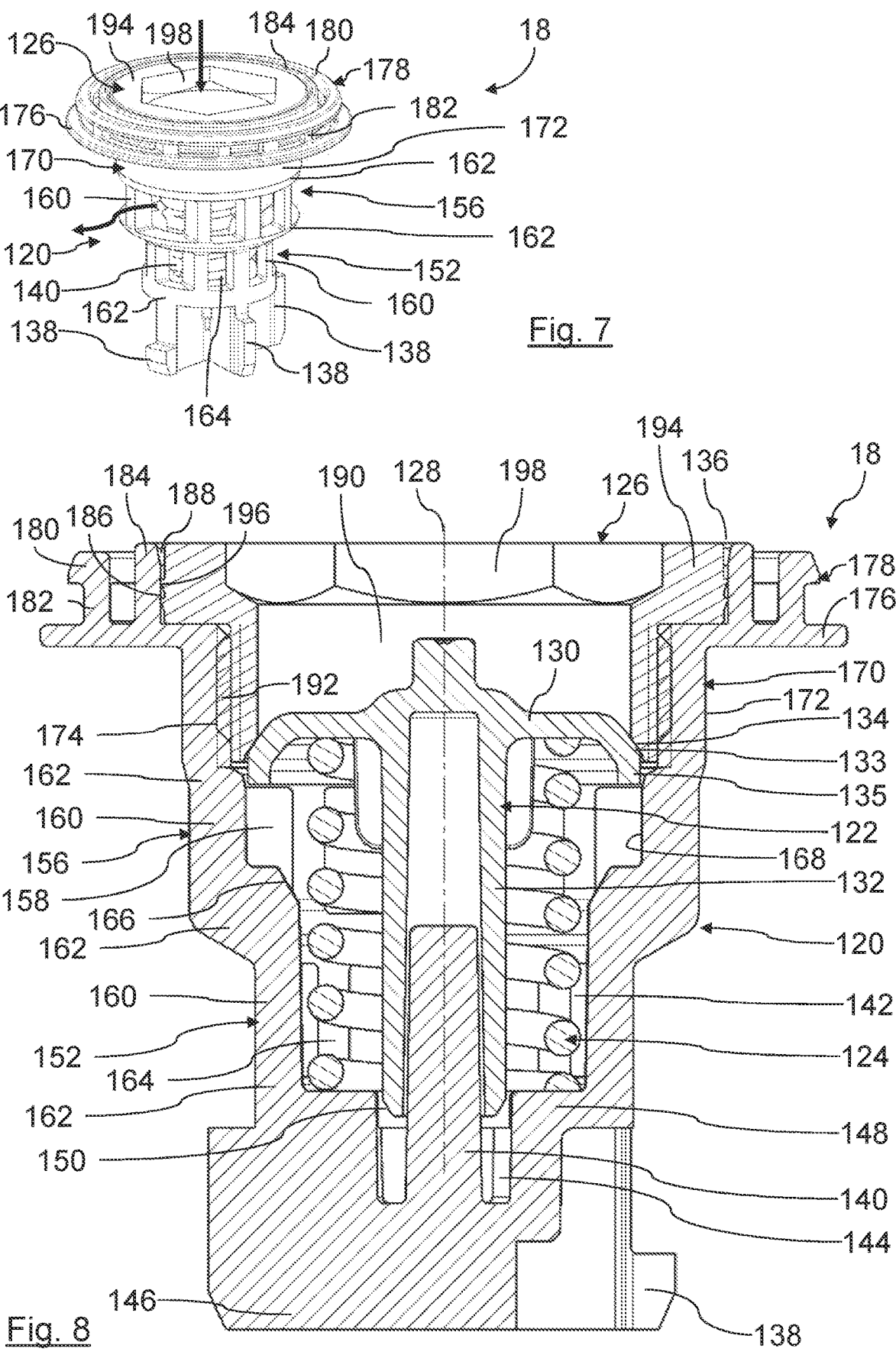
FIG. 7 shows an isometric view of the bypass valve arrangement according to the first embodiment of the filter of FIGS. 1 to 3.
FIG. 8 shows a longitudinal section of the bypass valve arrangement according to the first embodiment of the filter of FIGS. 1 to 3.

The bypass valve arrangement 18 according to the first embodiment is shown in detail in FIGS. 7 and 8. The bypass valve arrangement 18 comprises a valve housing 120, a valve closure body 122, a valve return element 124, in an exemplary fashion in form of a coaxial coil pressure spring, and a valve seat element 126.

The valve closure body 122 is arranged axially movable relative to the valve axis 128 in the valve housing 120. The valve closure body 122 comprises a valve plate 130 and a valve rod 132. The valve plate 130 and the valve rod 132 are embodied as one piece in an exemplary embodiment.

The valve rod 132 has the shape of a hollow circular cylinder.

The valve plate 130 is arranged at an axial end of the valve rod 132 and closes there the interior of the valve rod 132. The valve plate 130 is bent at its radially outer rim toward the free end of the valve rod 132. The thus formed radially outer circumferential side of the valve plate 130 has a coaxial circular cylindrical extension and forms a guide section 135. The interior of the valve rod 132 is open at the free end.

The bent rim of the valve plate 130 forms a valve seat contact surface 133 in the region of the bend. In the closed position which is illustrated in FIGS. 1, 2, and 6 to 8, the valve seat contact surface 133 is seal-tightly resting against a valve seat 134 of the valve seat element 126. The valve plate 130 and the valve seat 134 each have as a whole a shape of rotational symmetry relative to the valve axis 128.

The valve plate 130 comprises at its axial outer side a coaxial sleeve. The outer diameter of the sleeve corresponds approximately to the inner diameter of the interior of the valve rod 132.

The valve housing 120 is configured as a valve basket or valve cage. The valve housing 120 comprises a coaxial circumferential wall. The circumferential wall comprises a plurality of flow-through openings 164 for fluid. The circumferential wall is stepped multiple times in axial direction. At an axial top side in FIGS. 7 and 8, the valve housing 120 has an installation opening 136 for the valve seat element 126. At the axial bottom side, the valve housing 120 is closed by a bottom section 146.

At the side which is facing the bottom section 146, the valve housing 120 has at the radially outer circumferential side several wings 138 which extend radially outwardly, respectively. The wings 138 are connected to the bottom section 146 in a one-piece configuration. The wings 138 end with an axial end face at the same level as the bottom side of the bottom section 146, respectively. The end faces of the wings 138 facing axially away from the bottom side of the bottom section 146 are located at axially different levels, viewed in axial direction. The end faces of the wings 138 facing axially away from the bottom side of the bottom section 146 extends along an imaginary coaxial helical line. The wings 138 can be joined, for example, with corresponding parts of the support basket 100 of the filter element 16 to a bayonet closure-type connection.

In the interior of the valve housing 120, a guide cylinder 140 extends from the bottom section 146 coaxially into a coaxial receiving space 142 for the valve return element 124. The guide cylinder 140 is connected the bottom section 146 in a one-piece configuration.

At the side of the bottom section 146 which is facing the interior of the valve housing 120, a circumferentially continuous coaxial annular guide groove 144 is arranged. The annular guide groove 144 surrounds the guide cylinder 140.

The valve rod 132 of the valve closure body 122 is positioned movably in axial direction on the guide cylinder 140. The guide cylinder 140 and the annular guide groove 144 guide the valve rod 132 during its axial movements.

The valve rod 132 comprises at its open end radially outwardly a guide ramp 150. By means of the guide ramp 150, the valve rod 132 can be inserted more easily into the annular guide groove 144 during its axial movement.

Radially outwardly of the annular guide groove 144, the bottom section 146 forms a support section 148 which extends in radial direction and circumferentially. At the support section 148, the valve return element 124, namely the coil spring, is supported with one end. With the other end, the valve return element 124 is supported at the bottom side of the valve plate 130. The valve return element 124 acts on the valve plate 130 and pushes the valve plate 130 against the valve seat 134.

The bottom section 146 passes into a circumferential receiving wall section 152 in a one-piece configuration. The receiving wall section 152 surrounds coaxially the receiving space 142 for the bottom part of the valve return element 124 which is facing the bottom section 146. The inner diameter of the receiving space 142 is somewhat larger than the outer diameter of the valve return element 124.

Behind a step in radially outward direction, the receiving wall section 152 passes into a circumferential guide space wall section 156 in a one-piece configuration. The guide space wall section 156 surrounds a coaxial guide space 158 for the valve plate 130. The receiving wall section 152 and the guide space wall section 156 are each realized by axially extending wall stays 160. The wall stays 160 extend respectively between two coaxial annular sections 162, which are spaced apart in axial direction. The central annular section 162 is positioned at the level of the step between the receiving wall section 152 and the guide space wall section 156. Between the wall stays 160, continuous flow-through openings 146 for fluid are realized, respectively. The receiving wall section 152 and the guide space wall section 156 are permeable for fluid.

In the region of the central annular section 162, the wall stays 160 of the receiving wall section 152 and the wall stays 160 of the guide space wall section 156 overlap in axial direction.

The wall stays 160 of the receiving wall section 152 comprise at their ends facing away from the bottom section 146 a respective insertion ramp 166 at the radial inner circumferential side. The insertion ramps 166 facilitate installation of the valve return element 124.

Above the wall stays 160 of the receiving wall section 152, the radially inner circumferential sides of the wall stays 160 of the guide space wall section 156 extend in axial direction. The radially inner circumferential side of the wall stays 160 of the guide space wall section 156 form radially outer guide surfaces 168. At the guide surface 168, the guide section 135 of the valve plate 130 is guided upon a movement of the valve closure body 122 in axial direction.

At the side which is axially facing away from the bottom section 146, the top annular section 162 of the guide space wall section 156 passes into a screwing and sealing section 170 in a one-piece configuration.

The radially outer circumferential side of the screwing and sealing section 170 forms a seal surface 172. The seal surface 172 has the shape of a coaxial circular cylinder wall. With the bypass valve arrangement 18 installed, the seal rings 118 of the inlet-side end cap 108 of the filter element 16 rest in radial direction seal-tightly at the seal surface 172.

The radially inner circumferential side of the screwing and sealing section 170 comprises a coaxial valve housing thread 174 in the form of an inner thread.

At the side facing axially away from the bottom section 146, the screwing and sealing section 170 passes in a one-piece configuration into a fastening flange 176 which extends circumferentially and radially outwardly.

The fastening flange 176 comprises at its side which is axially facing away from the bottom section 146 a one-piece housing fastening element 178. The housing fastening element 178 comprises a coaxial circumferentially continuous locking ring 180. The locking ring 180 is connected with a plurality of fastening stays 182 to the fastening flange 176 in a one-piece configuration. The fastening stays 182 extend respectively in axial direction and are arranged distributed in circumferential direction. When the filter 12 is mounted, the locking ring 180 locks behind the locking projection 96 of the holding basket 88 of the housing cover 26. With the housing fastening element 178 and the locking projection 96, the bypass valve arrangement 18 is held at the housing cover 26.

Radially within the housing fastening element 178, a coaxial seal cylinder section 184 is arranged. The seal cylinder section 184 is connected to the side of the fastening flange 176 which is facing away from the bottom section 146 in a one-piece configuration. The radially outer circumferential side of the seal cylinder section 184 is spaced apart relative to the radially inner circumferential side of the housing fastening element 178. The inner diameter of the seal cylinder section 184 is larger than the inner diameter of the screwing and sealing section 170. The radially inner circumferential side of the seal cylinder section 184 is configured as seal surface 186. At its rim which is facing axially away from the bottom section 146, the seal cylinder section 184 has an insertion ramp 188 at the radially inner circumferential side. The insertion ramp 188 facilitates the installation of the valve seat element 126 in the valve housing 120.

The valve seat element 126 has as a whole the shape of a stepped hollow circular cylinder which is arranged coaxially. At the side which is axially facing the bottom section 146 of the valve housing 120, the valve seat element 126 has a coaxial thread wall section 190 which is extending circumferentially and axially. The thread wall section 190 comprises at its radially outer circumferential side a valve seat element thread 192 in the form of an outer thread. The valve seat element thread 192 in the mounted state is screwed into the valve housing thread 174 and forms therewith a screw connection. The screw connection can be realized by means of a relative rotation between the valve seat element 126 and the screwing and sealing section 170 of the valve housing 120 and separated in opposite rotational direction.

The free rim of the thread wall section 190 which is facing the bottom section 146 is slanted at the radial inner circumferential side and forms thereat the valve seat 134.

The inner diameter of the thread wall section 190 is smaller than the outer diameter of the valve plate 130. In the closed state of the bypass valve arrangement 18 illustrated in FIG. 8, the radially outer circumferential side of the valve plate 130 rests under the spring force of the valve return element 124 seal-tightly at the valve seat 134.

Behind a step in radially outward direction, the thread wall section 190 passes into the operating and sealing wall section 194 in a one-piece configuration. The operating and sealing wall section 194 comprises at the radially outer circumferential side a plurality of sealing knobs 196 which extend circumferentially continuously and radially outwardly.

The outer diameter of the operating and sealing wall section 194 is somewhat smaller than the inner diameter of the seal cylinder wall section 184 of the valve housing 120. With mounted valve seat element 126, the sealing knobs 196 are resting, sealing in radial direction, at the radially inner circumferential side of the seal cylinder wall section 184.

The radially inner circumferential side of the operating and sealing wall section 194 is designed as an operating element 198. The operating element 198 comprises in an exemplary fashion the shape of a hexagon socket opening. With an appropriate tool, for example, a hexagon socket wrench, it is possible to engage the operating element 198. By operating with the tool, the valve seat element 126 can be screwed into the screwing and sealing section 170 of the valve housing 120 or can be unscrewed therefrom. Moreover, the pre-mounted bypass valve arrangement 18 can be inserted into the installation opening in the inlet-side end cap 108 by operating with the tool.

With mounted bypass valve arrangement 18, the interior of the valve seat element 126 is fluidically connected via the through openings 92 of the holding basket 88 to the fluid inlet 54. In this manner, the fluid pressure of the raw fluid side of the filter element 16 is applied. The interior of the valve housing 120 is connected via the through openings 164 to the element interior 102 of the filter element 16. In the interior of the valve housing 120, the fluid pressure of the clean fluid side of the filter element 16 is applied.

In case that the filter element 16, respectively, the filter medium 98, for example, due to separated particles, is partially or completely blocked, the pressure difference between the raw fluid side and the clean fluid side increases, i.e., between the interior of the valve seat element 126 and the interior of the valve housing 120. The pressure difference effects an opening force in axial direction on the valve plate 130. As soon as the opening force surpasses the spring force of the valve return element 124, the bypass valve arrangement 18 is opened.

Thus, the raw fluid can pass directly through the bypass valve arrangement 18 into the element interior 102 of the filter element 16 and from there to the fluid outlet 30. In this way, in case of blocked filter element 16, fluid can pass through the filter 12.

The diffuser device 20 according to the first embodiment is illustrated in detail in FIGS. 4 and 5. The diffuser device 20 comprises a diffuser connection section 200 and a fluid guiding section 202. The diffuser connection section 200 comprises a circular cylindrical diffuser connection socket 206 that is coaxial in relation to the diffuser main flow axis 204. The diffuser connection socket 206 surrounds a diffuser inlet channel 208.

In exemplary fashion, the diffuser device 20 is manufactured as one-piece component by use of thermoplastic material, for example, of a group of polyamide, polyester, polypropylene or another thermoplastic material, for example, according to an injection molding process.

The diffuser main flow axis 204 indicates the main inflow direction of the fluid out of the fluid outlet 30 of the filter element 16 into the diffuser connection section 200.

At the free end of the connection socket 206 that is facing axially the fluid outlet 30 of the filter 12, the rim is formed at the radially inner circumferential side as an insertion ramp 212. The insertion ramp 212 facilitates the insertion of the outlet socket 34 into the diffuser connection socket 206.

Axially behind the insertion ramp 212, the radially inner circumferential side of the connection socket 206 is designed as a circumferential connection seal surface 210. The connection seal surface 210 is coaxial circular cylindrical. With mounted diffuser device 20, the seal ring 42, which is located at the outlet socket 34 of the filter, is resting, acting sealingly in radial direction, on the connection seal surface 210.

Two fixation elements 214, each in an exemplary fashion of a one-piece configuration, are arranged in the form of locking elements radially outside of the diffuser connection socket 206. The fixation elements 214 are located on radially oppositely positioned sides. The fixation elements 214 each comprise a fastening arm extending parallel to the diffuser main flow axis 204. The fastening arms are connected with one end by means of a web to the radially outer circumferential wall of the diffuser connection socket 206 in a one-piece configuration. The fastening arms project in axial direction past the free rim of the diffuser connection socket 206. At the free ends of the fastening arms, a radially inwardly oriented locking nose is realized, respectively. With mounted diffuser device 20, the locking noses of the fixation elements 214 lock behind the locking collar 38 at the outlet socket 34 of the filter housing 14 and form in this way a quickly connectable locking connection, separable without being destroyed, between the diffuser device 20 and the filter housing 14.

Diffuser connection socket 206 passes at its side facing axially away from the free end into the fluid guiding section 202 in a one-piece configuration. The fluid guiding section 202 itself is also of a one-piece configuration. The fluid guiding section 202 comprises as a whole eight fluid guiding channels 216, for example. The fluid guiding channels 216 are arranged in an exemplary fashion in two channel groups 224. Each channel group 224 comprises four of the fluid guiding channels 216.

The fluid guiding channels 216 have in an exemplary fashion identical shape and dimensions. At their radially inner side, the fluid guiding channels 216 through respective fluid connection openings 228 are connected to the diffuser inlet channel 208. In relation to the diffuser main flow axis 204, the fluid guiding channels 216 extend radially outwardly at a slant to the diffuser main axis 204. At the radially outer circumferential side, the fluid guiding channels 216 each comprise a channel outlet opening 230 that is rectangular in an exemplary fashion.

The fluid guiding channels 216 each have a rectangular cross-section in an exemplary fashion. The fluid guiding channels 216 widen in their width, tangentially to the diffuser main flow axis 204, viewed from their respective fluid connection opening 228 toward the channel outlet opening 230.

Each fluid guiding channel 216 is delimited by two central fluid guiding surfaces 218 that are oppositely positioned relative to a respective channel axis 222 and two lateral fluid guiding surfaces 220 that are also oppositely positioned relative to the channel axis 222. The fluid guiding surfaces 218 and 220 each are planar. The two central fluid guiding surfaces 218 extend parallel to each other. Also, the two lateral fluid guiding surfaces 220 extend parallel to each other. The central fluid guiding surfaces 218 and the lateral fluid guiding surface 220 of a fluid channel 216 extend perpendicularly to each other. The lateral fluid guiding surfaces 220 each have the shape of a parallelogram. The central fluid guiding surfaces 218 each have the shape of an isosceles trapezoid. The central fluid guiding surfaces 218 of a channel group 224 extend parallel to each other.

The central fluid guiding surfaces 218 each are realized at central channel walls 225. Neighboring central fluid guiding surfaces 218 of neighboring fluid channels 216 of a channel group 224 are realized on oppositely positioned sides of the same central channel wall 225. The lateral fluid guiding surfaces 220 on the same side of a channel group 224 are realized at a common lateral channel wall 227. The lateral channel walls 227 as a whole have the shape of a parallelogram. The central channel walls 225 and the lateral channel walls 227 are also planar, for example. An imaginary plane, which is defined by the rims of the channel outlet openings 230 of a channel group 224, extends parallel to the diffuser main flow axis 204. In an exemplary fashion, the planes of the rims of the channel outlet opening 230 of the two oppositely positioned channel groups 224 extend also parallel to each other.

The two channel groups 224 with the respective four fluid channels 216 are arranged on oppositely positioned sides in relation to the diffuser main flow axis 204. For example, the channel groups 224 are arranged and configured symmetrically in relation to an imaginary symmetry plane with the diffuser main flow axis 204. The channel groups 224 are located respectively on the same side of the diffuser connection socket 206 where also one of the fixation elements 214 is located. In this manner, the force introduction via the fixation elements 214 into the outlet socket 34 can be improved.

The fluid channels 216, respectively the channel axes 222, and the central fluid guiding surfaces 218 extend respectively at an acute angle 226 relative to the diffuser main flow axis 204.

The angle 226 amounts to approximately 120°, for example. The angle 226 can comprise also a different value, preferably between 90° and 180°. Due to the incline of the fluid guiding channels 216 and the central fluid guiding surfaces 218 relative to the diffuser main flow axis 204, the filtered fluid that flows into the diffuser inlet channel 208 is correspondingly deflected.

Upon operation of the filter 12, the fluid to be filtered flows through the fluid inlet 54 into the interior of the housing connection part 24. From there, the fluid to be filtered flows into an annular chamber of the housing pot 22 that surrounds the filter medium 98 radially outwardly. From the annular chamber, the fluid to be filtered flows through the filter medium 98 in radial direction from the exterior to the interior, is filtered by it, and reaches the element interior 102. The filtered fluid passes through the central tube 50 into the outlet socket 34.

In case the filter medium 98 is clogged, the fluid to be filtered passes directly through the bypass valve arrangement 18 into the element interior 102 and from there into the outlet socket 34.

The fluid flows out of the outlet socket 34 into the diffuser inlet channel 208 and flows along the diffuser main flow axis 204 in the diffuser inlet channel 208.

The fluid is distributed onto the eight fluid guiding channels 216 so that the flow cross section is enlarged as a whole. Due to the enlargement of the flow cross section, the flow is slowed and calmed. The thus already calmed fluid is then guided in the fluid guiding channels 216 along the fluid guiding surfaces 218 and 220 and, due to the widening of the fluid guiding channels 216, is further calmed. Also, the flow direction of the fluid is deflected with the fluid guiding channels 216.

The calmed fluid passes through the channel outlet openings 230 into the tank 10.

Due to the slowing of the fluid flow, it is achieved that the fluid remains longer in the tank 10 as it would be the case without the diffuser device 20. In this manner, gas that is entrained in the fluid, for example, air, can be separated better. Due to the directional deflection of the fluid flow upwardly in direction of the fluid surface in the tank 10, also gas bubbles in the filtered fluid are forced to move to the liquid surface. In this way, the gas bubbles are separated from the fluid.

Figure 9:
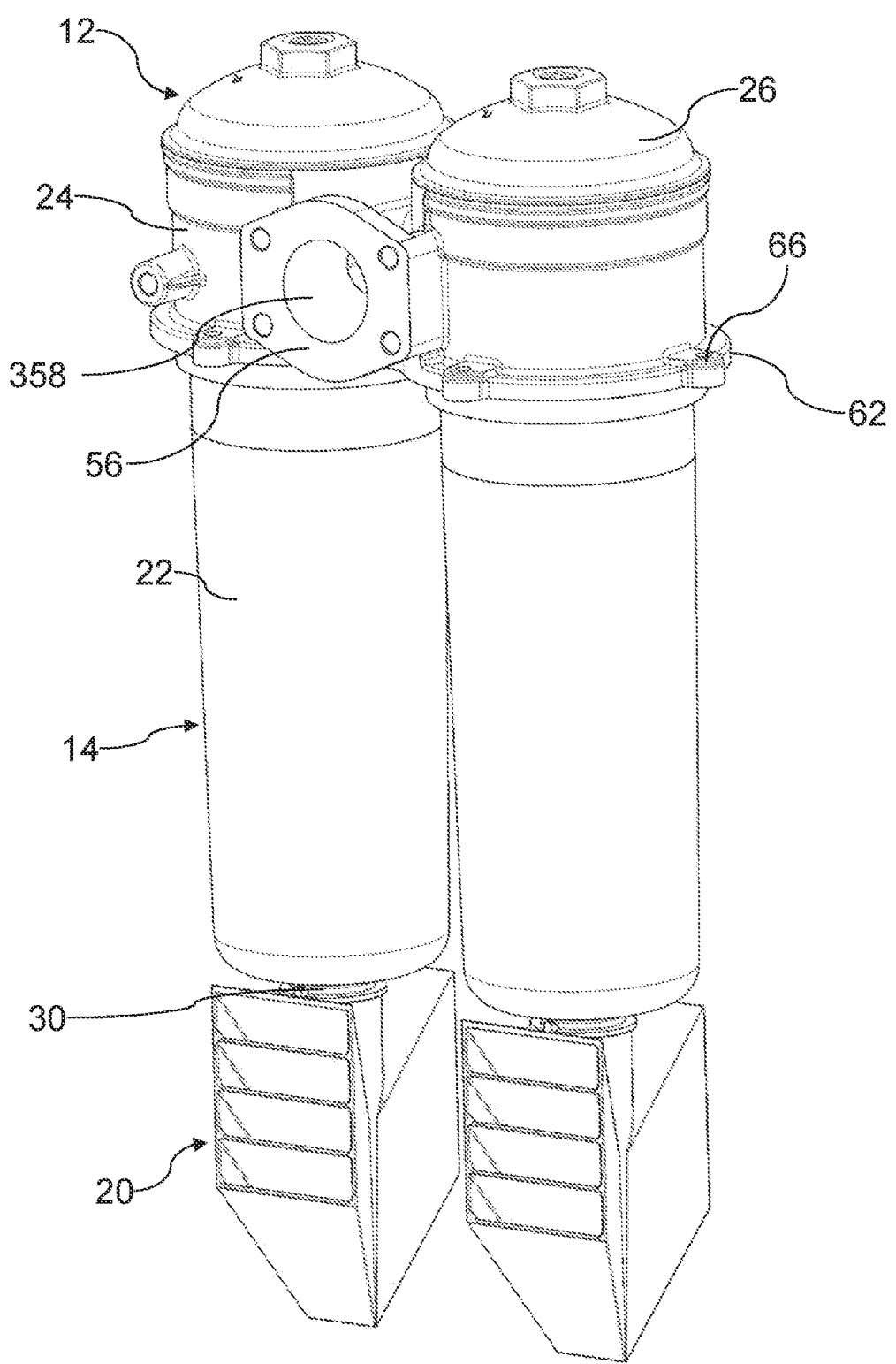
FIG. 9 shows an isometric illustration of a filter arrangement with two filters according to the first embodiment of FIGS. 1 to 3.

In FIG. 9, a filter arrangement with two filters 12 is shown. Those elements that are similar to those of the filter 12 of FIGS. 1 through 8 are provided with the same reference characters. The filters 12 are connected fluidically in parallel. The respective fluid inlets 14 are connected to each other by a central fluid inlet socket 358 and are connectable by means of a common connection flange 56 to corresponding fluid supply line.

Figures 10, 11:
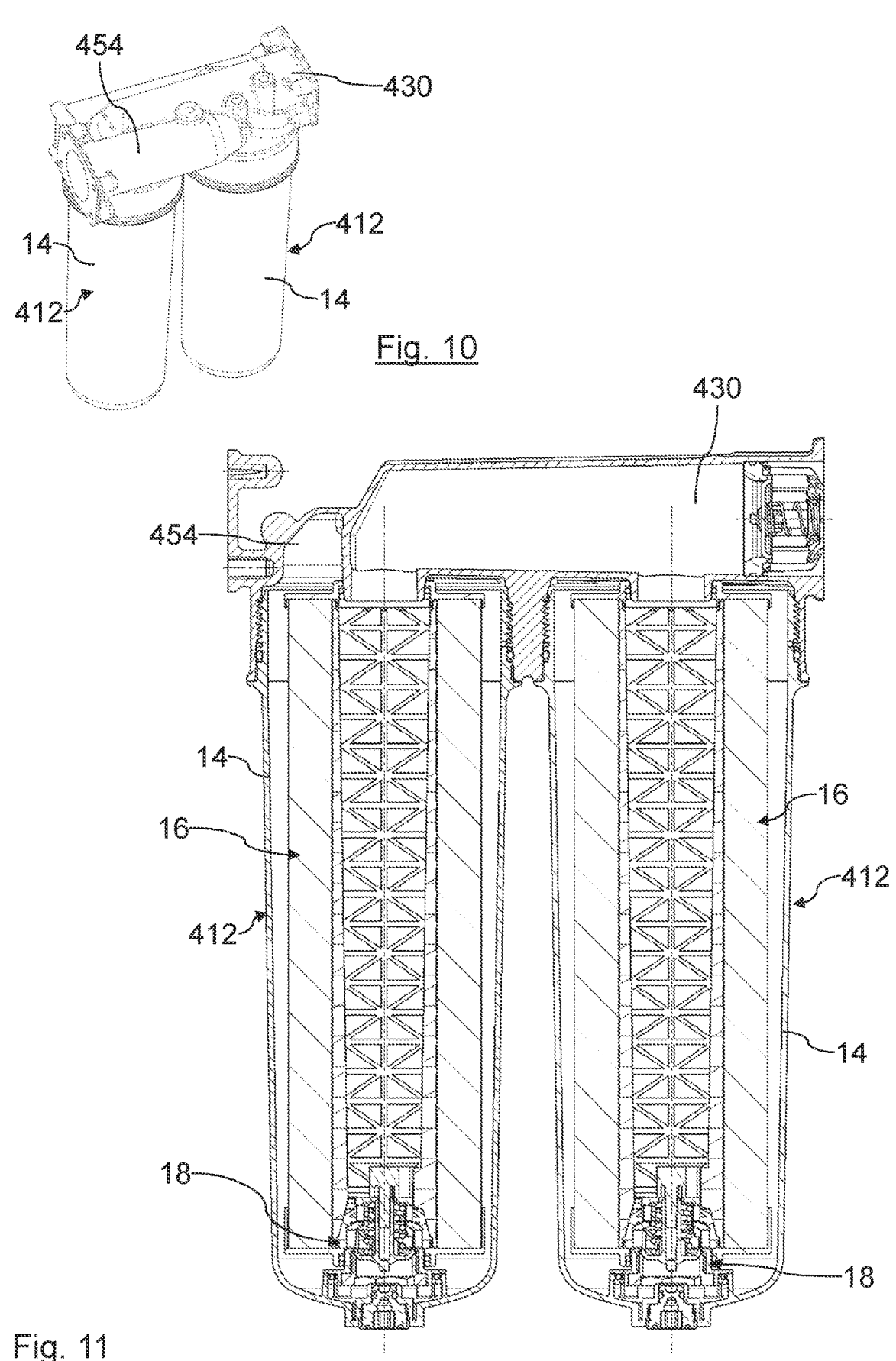
FIG. 10 shows an isometric illustration of a filter arrangement with two filters according to a second embodiment.
FIG. 11 shows a longitudinal section of the filter arrangement of FIG. 10.

In FIGS. 10 and 11, a filter arrangement is illustrated with two filters 412 in perspective view and in section. In contrast to the filter 12 of FIGS. 1 through 8, in the second embodiment the bypass valve arrangements 18 of the filters 412 are arranged spatially at the bottom in the filter housings 14. Instead, the respective fluid outlets 430 are spatially arranged at the top. Diffuser devices, as in the first embodiment, are dispensed with in the embodiment of FIGS. 10 and 11.

Figures 12, 13:
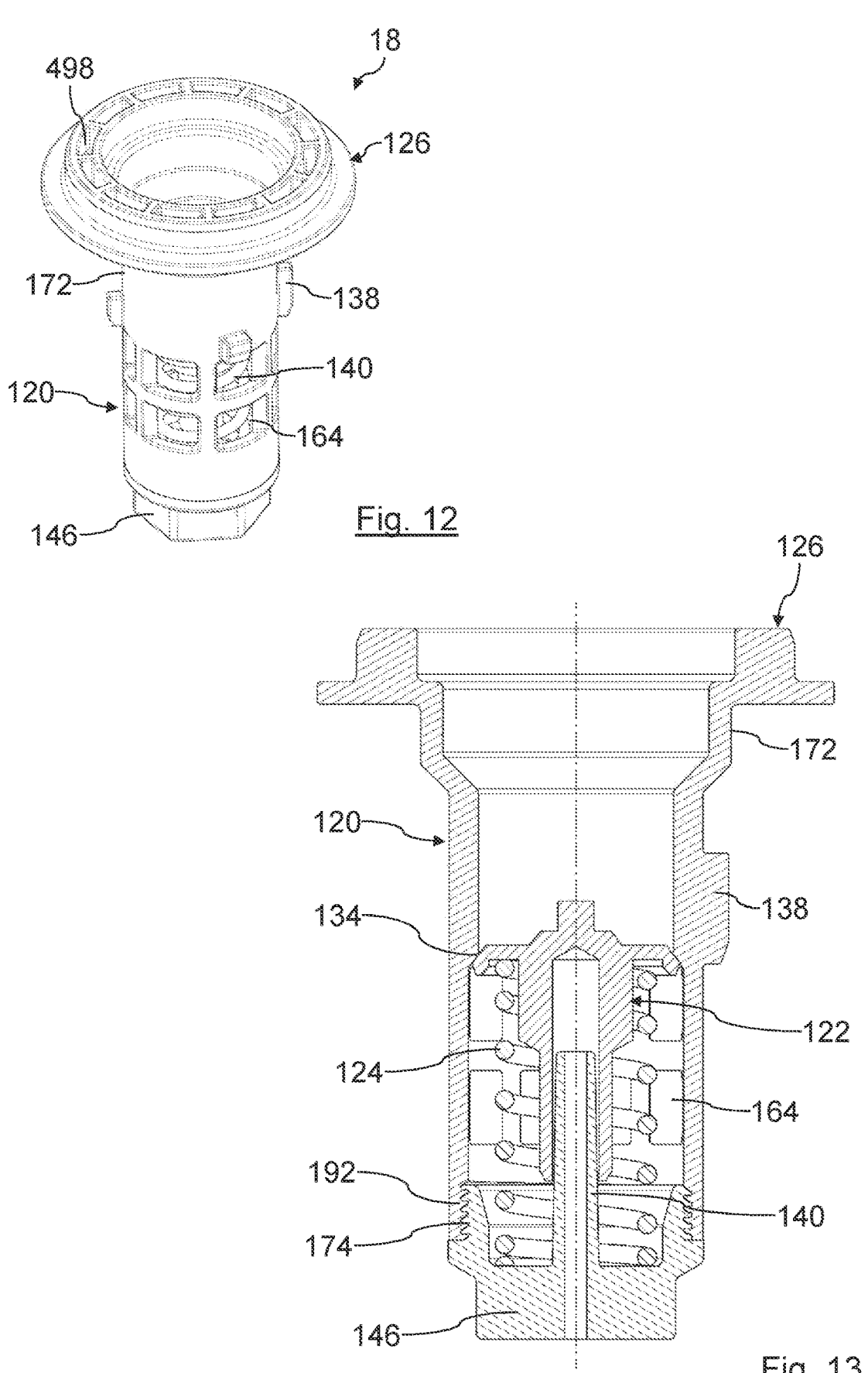
FIG. 12 shows an isometric illustration of a bypass valve arrangement according to a second embodiment.
FIG. 13 shows a longitudinal section of the bypass valve arrangement according to the second embodiment of FIG. 12.

In FIGS. 12 and 13, a bypass valve arrangement 18 according to a second embodiment is illustrated. Those elements that are similar to those of the filter 12 of FIGS. 1 through 8 are provided with the same reference characters. In contrast to the first embodiment of FIGS. 1 through 8, in the second embodiment the valve seat element 126 forms partially the circumferential wall of the valve housing 120. The valve seat 134 is located axially approximately at the center of the circumferential wall of the valve housing 120. The valve seat element thread 192 is embodied as an inner thread in the region of the free end of the circumferential wall. The valve housing thread 174 is realized as an outer thread on the part of the bottom section 146.

The guide cylinder 140 for the valve closure body 122 is hollow. The guide cylinder 140 is open at both ends and connects the interior of the valve closure body 122 to the environment below the bottom section 146.

Moreover, in the second embodiment of the bypass valve arrangement 18, instead of the operating element 198 in the form of a hexagon socket, a plurality of operating elements 498 in the form of openings are arranged, distributed circumferentially, at the end face of the valve seat element 26. The radially outer circumferential side of the bottom section 146 is designed as an external hexagon at which corresponding tools, for example, wrenches or the like, can engage for assembly of the bypass valve arrangement 18.

Figures 14, 15, 16:
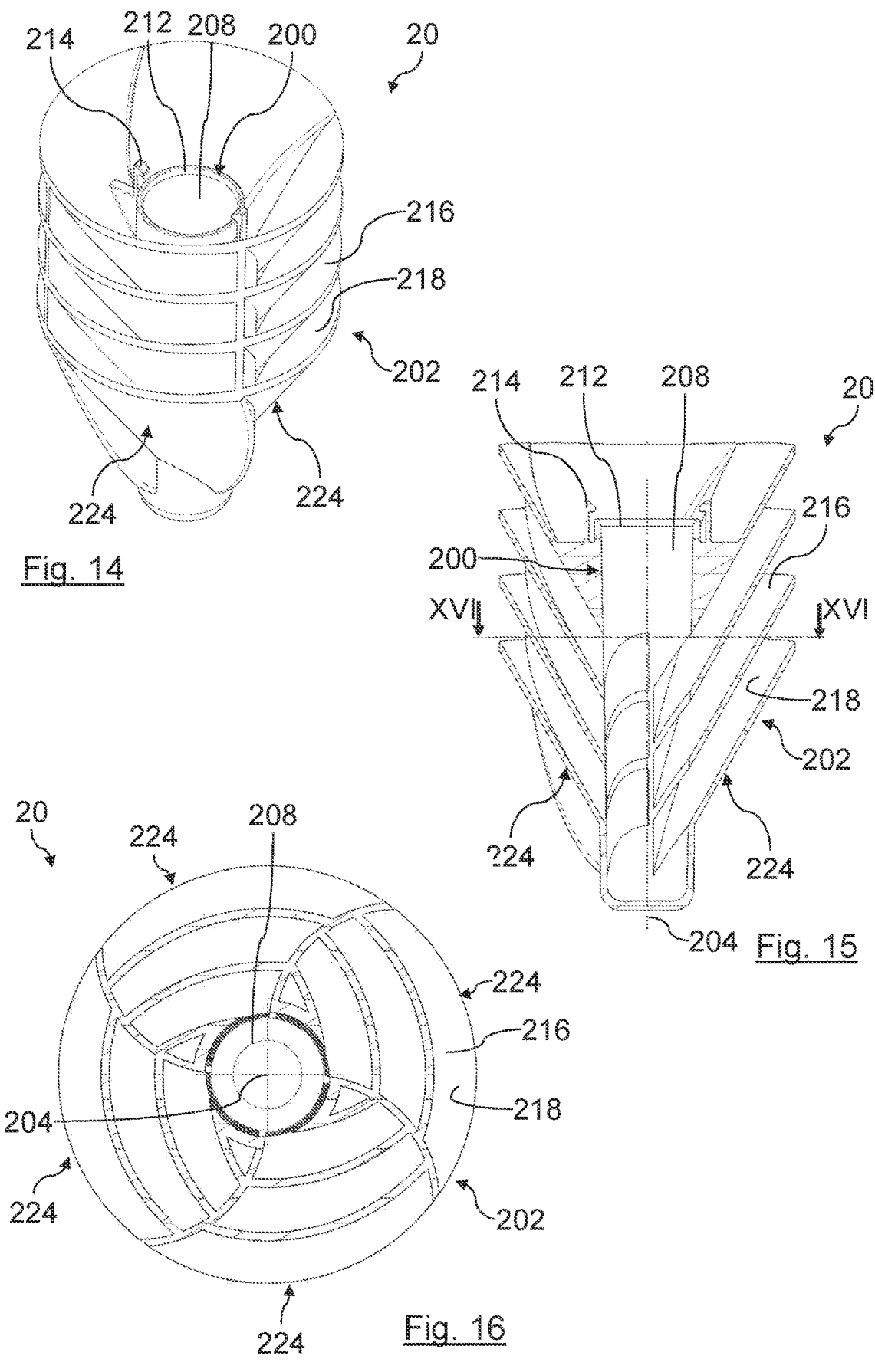
FIG. 14 shows an isometric illustration of a diffuser device according to a second embodiment.
FIG. 15 shows a longitudinal section of the diffuser device according to the second embodiment of FIG. 14.
FIG. 16 shows a cross section of the diffuser device according to the second embodiment of FIGS. 14 and 15 along a section line XVI-XVI of FIG. 15.

In FIGS. 14 to 16, a diffuser device 20 according to a second embodiment is illustrated. Those elements that are similar to those of the filter 12 of FIGS. 1 through 8 are provided with the same reference characters. In contrast to the first embodiment of FIGS. 1 through 8, in the second embodiment as a whole four channel groups 224, each with three fluid guiding channels 216, are distributed uniformly about the diffuser main flow axis 204.

The radially outer rims of the central fluid guiding surfaces 218 extend along an imaginary coaxial circular cylinder wall. The fluid guiding channels 216 widen outwardly. The central fluid guiding surfaces 218 widen in fluid flow direction.

Viewed in axial direction, the fluid guiding channels 216 each extend approximately spirally. Viewed in radial direction, the fluid guiding channels 216 each extend approximately helically.

What is claimed is:

1. A filter for filtering fluid, the filter comprising:
   a filter housing comprising a fluid inlet for fluid to be filtered and a fluid outlet for filtered fluid;
   a filter element arranged in the filter housing such that the filter element separates the fluid inlet fluidically from the fluid outlet;
   a bypass valve arrangement arranged fluidically between the fluid inlet and the fluid outlet such that the bypass valve arrangement, in an open state thereof, connects the fluid inlet fluidically to the fluid outlet;
   wherein the bypass valve arrangement comprises a valve housing;
   wherein the bypass valve arrangement further comprises a valve closure body arranged in the valve housing and movable between a closed position and an open position;
   wherein the bypass valve arrangement further comprises a valve seat element comprising a valve seat, wherein the valve closure body is configured to rest sealingly at the valve seat in the closed position;
   wherein the valve seat element is connected by a mechanical connection to the valve housing, by a rotation of one of the valve seat element and the valve housing relative to the other of the valve seat element and the valve housing about a valve axis of the bypass valve arrangement; and
   wherein the valve housing comprises a valve seal section that interacts sealingly with an element seal section of the filter element wherein the mechanical connection between the valve seat element and the part of the valve housing is a screw connection; wherein a thread of the valve seat element and a thread of the part of the valve housing form the screw connection, and wherein the thread of the valve seat element and/or the thread of the part of the valve housing is a non-self-tapping thread.

2. The filter according to claim 1, wherein the valve seat element comprises an outer thread and the valve housing comprises an inner thread for forming the screw connection, or wherein the valve seat element comprises an inner thread and the valve housing comprises an outer thread for forming the screw connection.

3. The filter according to claim 1, wherein a thread of the valve seat element and a thread of the valve housing form the screw connection, and wherein the thread of the valve seat element or the thread of the valve housing is a self-tapping thread.

4. The filter according to claim 1, wherein the valve housing comprises a valve seal section acting at least radially in relation to the valve axis of the bypass valve arrangement.

5. The filter according to claim 1, wherein the valve seat element comprises a housing fastening element connecting the valve seat element to the filter housing.

6. The filter according to claim 1, wherein the valve seat element comprises an operating section comprising a receptacle for an operating tool configured to operate the valve seat element when connecting the valve element to the valve housing.

7. The filter according to claim 1, wherein the bypass valve arrangement comprises a valve return element engaging with a first end of the valve closure body and with a second end of the valve housing.

8. The filter according to claim 1, wherein the valve seat element and/or the valve housing comprises a seal device configured to seal a region between the valve seat element and the valve housing.

9. The filter according to claim 1, wherein the filter is an in-tank filter and/or the filter is a liquid filter and/or a gas filter.

10. The filter according to claim 1, wherein the valve seat element is a hollow cylinder comprising an inner thread and/or an outer thread.

11. The filter according to claim 1, further comprising at least one diffuser device connected to the fluid outlet.

12. A bypass valve arrangement for a filter for filtering fluid, the bypass valve arrangement comprising:
   a valve housing;
   a valve closure body arranged in the valve housing and movable between a closed position and an open position; and
   a valve seat element comprising a valve seat, wherein the valve closure body is configured to rest sealingly at the valve seat in the closed position;
   wherein the valve seat element is connected by a mechanical connection to the valve housing realized by a rotation of one of the valve seat element and the the valve housing relative to the other of the valve seat element and the valve housing about a valve axis of the bypass valve arrangement;
   wherein the bypass valve arrangement is configured to be arranged fluidically between a fluid inlet and a fluid outlet of the filter such that the bypass valve arrangement, in an open state thereof, fluidically connects the fluid inlet to the fluid outlet; and
   wherein the valve seat element comprises a housing fastening element connecting the valve seat element to a housing of the filter wherein the mechanical connection between the valve seat element and the part of the valve housing is a screw connection; wherein a thread of the valve seat element and a thread of the part of the valve housing form the screw connection, and wherein the thread of the valve seat element and/or the thread of the part of the valve housing is a non-self-tapping thread.

13. A filter for filtering fluid, the filter comprising:
   a filter housing comprising a fluid inlet for fluid to be filtered and a fluid outlet for filtered fluid:
   a filter element arranged in the filter housing fluidically between the fluid inlet and the fluid outlet;
   a diffuser device for the filtered fluid, wherein the diffuser device is fluidically connected to the fluid outlet;
   wherein the diffuser device comprises a fluid guiding channel having fluid guiding surfaces wherein the mechanical connection between the valve seat element and the part of the valve housing is a screw connection; wherein a thread of the valve seat element and a thread of the part of the valve housing form the screw connection, and wherein the thread of the valve seat element and/or the thread of the part of the valve housing is a non-self-tapping thread.

14. The filter according to claim 13, wherein the fluid guiding channel is delimited by at least one of the fluid guiding surfaces.

15. The filter according to claim 13, wherein a channel axis of the fluid guiding channel extends at an angle between approximately 90° and 180° in relation to a main inflow axis of the diffuser device.

16. The filter according to claim 13, wherein the fluid guiding channel widens at least in sections, viewed in a fluid flow direction of the filtered fluid.

17. The filter according to claim 13, wherein at least two of the fluid guiding surfaces at least in sections extend parallel to each other.

18. The filter according to claim 13, wherein at least two of the fluid guiding surfaces at least in sections extend away from each other, viewed in a fluid flow direction of the filtered fluid.

19. The filter according to claim 13, wherein at least one of the fluid guiding surfaces at least in sections is positioned at an angle between approximately 90° and 180° in relation to a main inflow axis of the diffuser device.

20. The filter according to claim 13, wherein at least two of the fluid guiding surfaces are arranged on different sides in relation to a main inflow axis of the diffuser device.

21. The filter according to claim 13, wherein at least two of the fluid guiding surfaces are arranged on the same side in relation to a main inflow axis of the diffuser device.

22. The filter according to claim 13, wherein the diffuser device further comprises at least two of the fluid guiding channels arranged on different sides of the diffuser device in relation to a main inflow axis of the diffuser device.

23. The filter according to claim 13, wherein the diffuser device further comprises at least two of the fluid guiding channels arranged on the same side of the diffuser device in relation to a main inflow axis of the diffuser device.

24. The filter according to claim 13, wherein at least one of the fluid guiding surfaces, at least in sections, extends curved and/or straight.

25. The filter according to claim 13, wherein the fluid guiding channel, at least in sections, extends curved and/or straight.

26. The filter according to claim 13, wherein the diffuser device further comprises a diffuser connection section configured to be connected to the fluid outlet of the filter housing.

27. The filter according to claim 13, wherein the diffuser device further comprises at least one connection seal element configured to seal the diffuser device relative to the fluid outlet of the filter housing.

28. The filter according to claim 13, wherein the diffuser device further comprises at least one diffuser fixation element configured to fix the diffuser device at the filter housing.

29. The filter according to claim 13, wherein the diffuser device further comprises a diffuser inlet channel connected to the fluid guiding channel of the diffuser device and/or extending to at least one of the fluid guiding surfaces.

30. The filter according to claim 29, wherein a main inflow axis of the diffuser device extends within the diffuser inlet channel of the diffuser device.

31. The filter according to claim 29, wherein the diffuser inlet channel comprises a constant cross section.

\* \* \* \* \*